United States Patent [19]
Yamamoto

[11] Patent Number: 5,909,028
[45] Date of Patent: Jun. 1, 1999

[54] POSITION TRANSDUCER AND POSITIONAL INFORMATION PROCESSING SYSTEM USING THE SAME

[75] Inventor: Jun Yamamoto, Hamamatsu, Japan

[73] Assignee: Yamaha Corporation, Shizuoka-Ken, Japan

[21] Appl. No.: 08/754,253

[22] Filed: Nov. 20, 1996

[30] Foreign Application Priority Data

Nov. 30, 1995 [JP] Japan .................................. 7-313184

[51] Int. Cl.$^6$ ................................. G01D 5/32; G10F 5/00

[52] U.S. Cl. ..................... 250/221; 250/227.22; 250/229; 84/724

[58] Field of Search ......................... 250/229, 55, 227.21, 250/227.22; 385/138, 139, 88, 89, 90, 91, 92, 93, 33, 36; 84/639, 640, 723, 724, 744, 745, 171, 172

[56] References Cited

U.S. PATENT DOCUMENTS

| | | |
|---|---|---|
| 4,351,221 | 9/1982 | Starnes et al. . |
| 4,836,636 | 6/1989 | Obara et al. ............................. 250/229 |
| 4,868,568 | 9/1989 | Souloumiac ............................. 250/229 |
| 4,913,026 | 4/1990 | Kaneko et al. . |
| 4,935,621 | 6/1990 | Pikulski .................................. 250/229 |
| 5,001,339 | 3/1991 | Starkey et al. . |
| 5,384,459 | 1/1995 | Patino et al. ............................ 250/229 |
| 5,804,816 | 9/1998 | Yamamoto et al. .................... 250/229 |

*Primary Examiner*—Edward P. Westin
*Assistant Examiner*—John R. Lee
*Attorney, Agent, or Firm*—Hazel & Thomas, P.C.

[57] ABSTRACT

A non-contact type position transducer has a light emitting block for splitting a light beam into two light sub-beams and a light detecting block for receiving one of the light sub-beams and another light sub-beam radiated from another light emitting block, and the light emitting blocks and the light detecting blocks shared between a plurality of non-contact type position transducers make the arrangement of non-contact type position transducers simple.

16 Claims, 17 Drawing Sheets

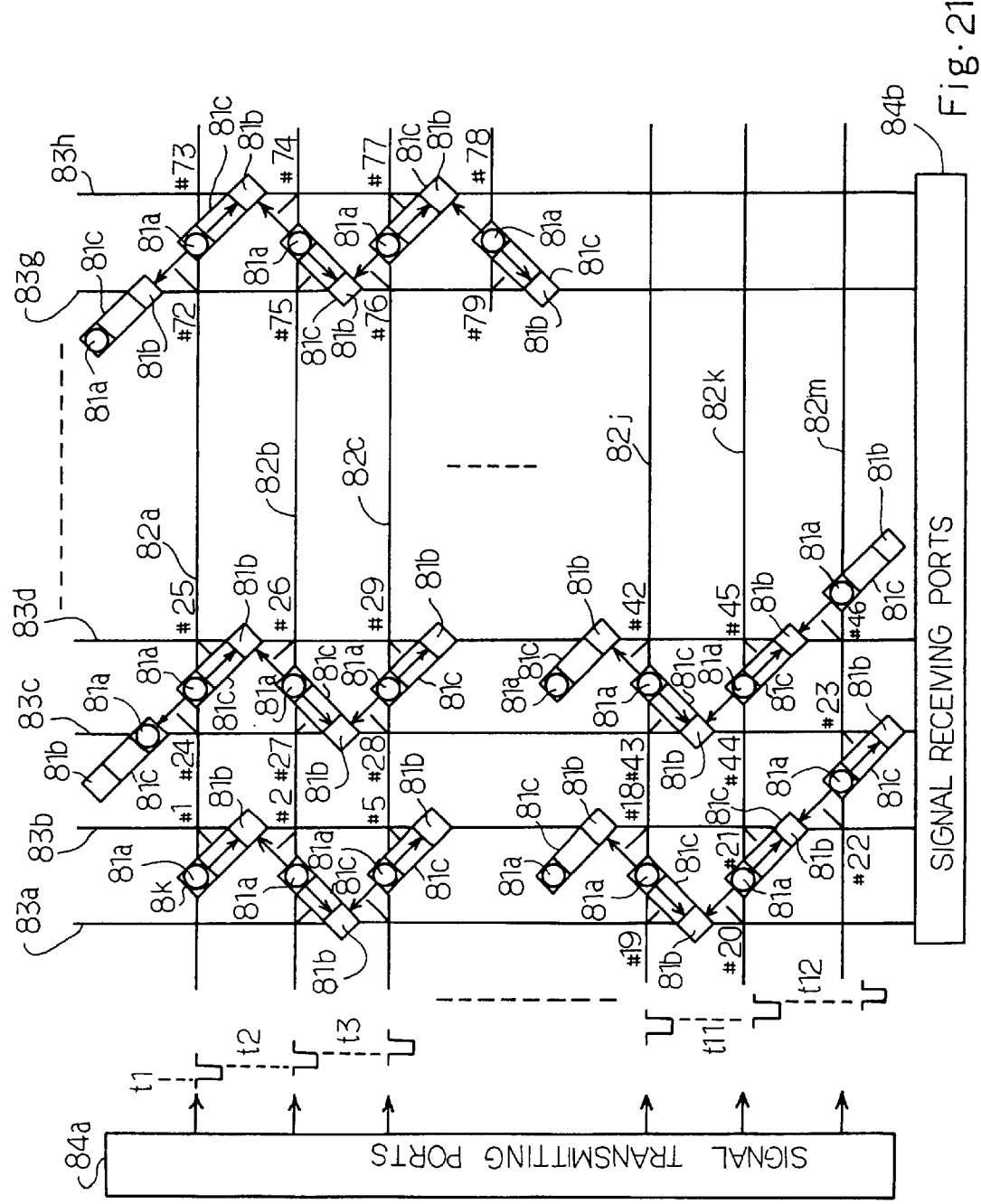

ition transducer for detecting a position of a movable body such as a key of a keyboard musical instrument and a positional information processing system for processing the positional information supplied from the position transducer.

DESCRIPTION OF THE RELATED ART

An automatic player piano and a silent piano are typical examples of a piano-like keyboard musical instrument. The automatic player piano is fabricated on the basis of an acoustic piano, and a data processing unit, position transducers and solenoid-operated actuators are incorporated in the automatic player piano. The position transducers monitor the keys and/or hammers during a performance on the keyboard, and continuously supply pieces of positional information to a data processing unit. The data processing unit identifies depressed keys from the pieces of positional information, and determines the key/hammer motions. The data processing unit produces a series of music data codes representative of the key/hammer motions, and stores the series of music data codes in a suitable recording medium. In a playback, the music data codes are sequentially read out from the recording medium, and the data processing unit determines target trajectories from the music data codes for the keys to be moved. The solenoid-operated actuators move the keys along the target trajectories, and the acoustic piano reproduces the original performance without fingerings of a player.

The silent piano is disclosed in U.S. Pat. No. 5,374,775. The silent piano is also fabricated on the basis of an acoustic piano, and a hammer stopper, position transducers, a data processing unit, a tone generator and a headphone are incorporated in the silent piano. When the hammer stopper is moved to a free position where the hammer stopper does not impede the hammer motions, the silent piano behaves as similar to a standard acoustic piano, and a pianist plays a tune on the silent piano through the acoustic sounds. On the other hand, if the hammer stopper is changed to a blocking position where the hammer rebounds on the hammer stopper before a strike at the strings, the silent piano behaves as an electronic keyboard musical instrument. The position transducers monitor the keys/hammers, and supply pieces of positional information of the keys/hammers to the data processing unit. The data processing unit processes the positional information in a real time manner, and produces music data codes representative of the key/hammer motions. The music data codes are supplied to the tone generator, and the tone generator tailors an audio signal from the music data codes. The audio signal is supplied to the headphone, and the player hears an electronic sound instead of the acoustic sound.

Thus, the position transducers are indispensable component elements of the automatic player/silent piano, and FIGS. 1 and 2 illustrate typical examples of the contact-type position transducer. Each of the keys is accompanied by a position transducer, and eighty-eight position transducers are usually provided under the keyboard.

The prior art contact-type position transducer 1 is mounted on a key bed 2, and a key 3 is turnable with respect to the key bed 2. The prior art contact-type position transducer 1 comprises a rigid column member 1a placed on the key bed 2, a resiliently deformable ball member 1b mounted on the rigid column member 1a, a fixed contact 1c attached to the rigid column member 1a and a movable contact 1d fixed to an inner surface of the resiliently deformable ball member 1b.

A rod member 1e is attached to the lower surface of the key 3, and is moved together with the key 3. When the key 3 stays in the rest position, the rod member 1e allows the resiliently deformable ball member 1b to space the movable contact 1d from the fixed contact 1c. If the key 3 is depressed, the rod member 1e presses the resiliently deformable ball member 1b against the rigid column member 1a, and crushes it so as to bring the movable contact 1d into contact with the fixed contact 1c. Then, current flows therebetween, and the prior art contact-type position transducer 1 outputs a key position signal KP1 representative of the new key position.

Another prior art contact-type position transducer 4 shown in FIG. 2 is called a "leaf switch", and is also placed on a key bed 5 for monitoring a key 6. The prior art contact-type position transducer 4 comprises an insulating block member 4a mounted on the key bed 5, two leaf springs 4b and 4c supported by the insulating block member 4a and a fixed contact 4d provided on the lower leaf spring 4b. The upper leaf spring 4c has a leading end portion bent in such a manner as to project over the insulating block 4a, and serves as a movable contact.

When the key 6 stays in the rest position, the upper leaf spring 4c is spaced from the fixed contact 4d, and no current flows between the leaf spring 4c and the fixed contact 4d. However, if the key 6 is depressed, the key 6 is brought into contact with the leading end portion 4e, and deforms the leaf spring 4c toward the other leaf spring 4d. The leaf spring 4c is pressed against the fixed contact 4d, and current flows so as to generate a key position signal KP2 representative of the new key position.

The contact-type position transducers tend to vary the detecting points due to the physical contact, and the contact-type position transducer is replaced with a non-contact type position transducer. FIG. 3 illustrates a typical example of the non-contact type position transducer used for a key 7.

The prior art non-contact type position transducer 8 is placed on a key bed, and comprises a shutter plate 8a attached to the lower surface of the key 7 and a photo-coupler 8b, i.e., a light emitting element 8c and a light detecting element 8d spaced from each other. The light emitting element 8c and the light detecting element 8d are embedded into a U-letter shaped bracket member 8e, and a light beam 8f is radiated from the light emitting element 8c to the light detecting element 8d.

When the key 7 stays in the rest position, the shutter plate 8a is resting over the light beam 8f. If the key 7 is depressed, the key 7 is downwardly moved together with the shutter plate 8a, and the shutter plate 8a intersects the light beam 8f. The light detecting element generates current in proportion to the light intensity, and the intersection causes the light detecting element 8d to decrease the amount of current. The current serves as a key position signal KP3 representative of the key position.

Another non-contact type position transducer is illustrated in FIG. 4. The prior art non-contact type position transducers 10 and 11 are respectively associated with keys 12 and 13, and sensor heads 14a, 14b and 14c are spaced from one another under the keys 12, 13, . . . . The sensor heads 14a to 14c have respective bifurcated portions defined by oblique inner surfaces and perpendicular outer surfaces, and, accordingly the bifurcated portions serve as prisms 14d, 14e, 14f, 14g, 14h and 14i. The oblique inner surfaces decline at 45 degrees with respect to the perpendicular outer surfaces, respectively. Convex lenses 14j, 14k, 14m, 14n, 14o and 14p are attached to the perpendicular outer surfaces, respectively, and optical fibers 14q, 14r, 14s, 14t, 14u and 14v are directed to the oblique inner surfaces, respectively. The optical fibers 14q, 14s and 14u are connected at the other ends thereof to a light detector (not shown), and a light emitter (not shown) is connected to the other ends of the optical fibers 14r, 14t and 14v. Shutter plates 14x and 14y are attached to the lower surfaces of the keys 12 and 13, respectively, and the optical fibers 14r/14s, the prisms 14e/14f, the convex lenses 14k/14m and the shutter plate 14x constitute and the optical fibers 14t/14u, the prisms 14g/14h, the convex lenses 14n/14o and the shutter plate 14y constitute prior art non-contact type position transducers associated with the keys 12 and 13.

When the keys 12 and 13 stay in the respective rest positions, the optical fibers 14r and 14t radiate light beams 15a and 15b toward the prisms 14e and 14g, and the light beams 15a and 15b are reflected on the oblique inner surfaces. The light beams 15a and 15b pass through the convex lenses 14k and 14n, and become parallel rays 15c and 15d. The parallel rays 15c and 15d proceed toward the convex lenses 14m and 14o, and are condensed on the oblique inner surfaces. The oblique inner surfaces reflect the light beams 15e and 15f toward the optical fibers 14s and 14u, and enter into the optical fibers 14s and 14u, respectively. The optical fibers 14s and 14u guide the light to the light detector.

In this situation, if the keys 12 and 13 are moved downwardly together with the shutter plates 14x and 14y, the shutter plates 14x and 14y intersect the parallel rays 15c and 15d, and change the light intensity.

An actual automatic player/silent piano requires eighty-eight contact-type position transducers or non-contact type position transducers, and a data processing unit periodically fetches the key position data supplied from these position transducers. If the eighty-eight position transducers are directly connected to the data processing unit, the data processing unit requires eighty-eight input signal ports, and, accordingly, occupies a large space. For this reason, a direct connection between the position transducers and the data processing unit is not feasible. For this reason, an interface is provided between the position transducers and the data processing unit.

FIG. 5 illustrates an interface available for the prior art contact type position transducers 1 or 4. The prior art contact type position transducers 1 or 4 form a switching matrix 17, and are arranged in rows and columns.

Every twelve keys of an acoustic piano are assigned to an octave, i.e., note A to note G#, and the rows of contact type position transducers are connected at input nodes thereof to twelve scanning signal lines 18a, 18b, 18c, 18d, ... and 18m. The twelve scanning signal lines 18a, 18b, 18c, 18d, ... and 18m are respectively assigned to the pitch names A, A#, B, C ... and G#.

The eighty-eight keys belong to eight octaves, and the prior art contact type position transducers are connected at output nodes thereof to eight detecting lines 19a, 19b, 19c, ... and 19h. The eight detecting lines 19a, 19b, 19c, ... and 19h are respectively assigned to the first octave, the second octave, the third octave, ... and the eighth octave.

The twelve scanning signal lines 18a to 18m are connected to signal transmitting ports 20a of the data processing unit 20, and the eight detecting lines 19a to 19h are connected to signal receiving ports 20b of the data processing unit 20. The data processing unit 17 sequentially supplies a scanning signal SCAN of active low level to the twelve scanning signal lines 18a to 18m, and checks the signal receiving ports 20b to see whether or not the scanning signal SCAN returns to the signal receiving portions 20b. The data processing unit 20 is assumed to put the scanning signal SCAN on the scanning signal lines 18a to 18m at t1, t2, t3, ... and t12. If the scanning signal SCAN returns to the detecting line 19c at timing t3, the data processing unit decides the key establishes a current path in the contact type position transducer 1x at the crossing point between the scanning signal line 18c and the detecting line 19c. On the other hand, if the scanning signal SCAN returns to the detecting line 19h at timing t1, the data processing unit 20 acknowledges the downward key motion associated with the prior art contact type position transducer 1y.

Thus, the switching matrix 17 allows the data processing unit 20 to specify one of the eighty-eight position transducers 1 or 4, and requires only twenty signal ports of the data processing unit 20.

The prior art contact type position transducers 1 or 4 are replaceable with the prior art non-contact type position transducers 8 as shown in FIG. 6. The prior art non-contact type position transducers 8 are also arranged in matrix 21, i.e., rows and columns, and the scanning signal lines 18a to 18m and the detecting lines 19a to 19h are connected to the rows of non-contact type position transducers 8 and the columns of non-contact type position transducers 8 as similar to the switching matrix 17.

The data processing unit sequentially supplies the scanning signal SCAN to the scanning signal lines 18a to 18m, and determines the keys downwardly moved from the timing and the detecting line. In this instance, the matrix 21 also requires only twenty signal ports.

The prior art non-contact type position transducers 10/11 are also available for a matrix. FIG. 7 illustrates the matrix 22 implemented by the prior art non-contact type position transducer 10. The sensor heads 14a are arranged in rows and columns. Each of the first to seventh rows is constituted by thirteen sensor heads 14a, and five sensor heads 14a form the eighth row, because the prior art non-contact position transducer provides a gap for the shutter plate 14x between adjacent two sensor heads 14a.

Twelve light emitting elements 23a, 23b, ..., 23j, 23k and 23m are provided for the twelve columns of non-contact type position transducers, and are connected to the sensor heads 14a through twelve bundles of optical fibers 24a, 24b, ..., 24j, 24c, 24d, ..., 24j, 24k and 24m. Each of the bundles 24a to 24d consists of eight optical fibers, and seven optical fibers form in combination each of the bundles for the fifth to twelfth column.

Eight light detecting elements 25a, 25b, ... and 25h are provided for the eight rows of non-contact type position transducers, and are connected to the prior art non-contact type position transducers of the associated rows through eight bundles of optical fibers 26a, 26b, ... and 26h. Each of the first to seventh bundles of optical fibers is constituted by twelve optical fibers, and the eighth bundle consists of four optical fibers.

The twelve light emitting elements 23a to 23m are connected to driving signal transmitting ports 27a of a data processing unit 27, and the eight light detecting elements 25a to 25h are connected to signal receiving ports 27b of the data processing unit 27b. The data processing unit 27 sequentially supplies a driving signal to the light emitting elements 2a to 23m, and the light emitting elements respectively generate photo-pulse signals at different timings. Thus, the data processing unit 27 periodically scans the twelve columns of non-contact type position transducers with the photo-pulse signal.

Each of the photo-pulse signals is distributed to the associated bundle of optical fibers, and is propagated through the optical fibers to the eight or seven non-contact position transducers. The photo-pulse signal radiates the light beams over the gaps between the sensor heads 14a. If all of the keys stay in the rest position, no shutter plate 14x intersects the light beams, and the light beams enter into the optical fibers respectively selected from the bundles 26a to 26h, and the light detecting elements generate key position signals. The key position signals are equal in potential level to one another, and the data processing unit 27 receives the key position signals from the signal receiving ports 27b.

One of the keys is assumed to be depressed. The associated shutter plate 14x intersects the light beam of the prior art non-contact position transducer located at the crossing point between the first row and the second column. While the shutter plate 14x is being moved between the sensor heads 14a, the light emitting element 23b generates the photo-pulse signal, and the photo-pulse radiates the light beam from the right sensor head 14a toward the left sensor head 14a. The light beam is reflected on the shutter plate 14x, and does not reach the optical fibers of the bundle 26a. For this reason, the light detecting element 25a changes the key position signal to the low potential level, and the data processing unit 27 specifies the depressed key.

If the prior art non-contact position transducer radiates two light beams spaced along the trajectory of the shutter plate 14x, the shutter plate 14x intersects the two light beams at different timings, and the data processing unit 27 can calculate the key velocity from the time interval between the intersection of the first light beam and the intersection of the second light beam.

The prior art non-contact type position transducer detects the current position of the movable body without a physical contact, and, accordingly, is durable compared to the prior art contact type position transducer.

When comparing the prior art non-contact type position transducer matrix 21 with the prior art non-contact type position transducer matrix 22, every one of the prior art non-contact type position transducers 8 requires a pair of light emitting/light detecting elements, and eighty-eight pairs of light emitting/light detecting elements are incorporated in the matrix 21. The light emitting/light detecting elements are so expensive that the prior art non-contact type position transducer matrix increases the production cost of the automatic player/silent piano.

On the other hand, each light emitting element is shared between the eight or seven non-contact type position transducers 10, and each light detecting element is shared between the twelve or four non-contact type position transducers 10. In other words, the prior art non-contact type position transducer matrix 22 requires only eight pairs of light-emitting/light-detecting elements and four light emitting elements. For this reason, the prior art non-contact type position transducer matrix 22 is economical, and reduces the production cost of the automatic player/silent piano.

However, the prior art non-contact type position transducer matrix 22 encounters a problem in the complicated arrangement of optical fibers. The photo-pulse signals are distributed from the twelve light emitting elements 23a to 23m to the sensor heads through eighty-eight optical fibers, and the light beams are propagated from the sensor heads through the eighty-eight optical fibers to the light detecting elements 25a to 25h. Therefore, the prior art non-contact type position transducer matrix 22 requires a hundred and seventy-six optical fibers for simply specifying the depressed key. If the prior art non-contact type position transducer matrix 22 is expected to support the calculation of the key velocity, the prior art non-contact type position transducer matrix 22 requires three hundred and fifty-two optical fibers. The prior art non-contact type position transducer matrix 22 is accommodated in an extremely narrow space between the keyboard and the key bed, and the complex arrangement of optical fibers makes the assembling work difficult.

Another problem inherent in the prior art non-contact type position transducer 10 is low availability of light. The light beam 15a is radiated from the optical fiber 14r, and is twice reflected by the prisms 14e/14f before entry into the optical fiber 14s (see FIG. 4). The prism 14e/14f reflects the light component incident onto the oblique inner surface within the critical angle. However, the light beam 15a diverges from the optical fiber 14r, and part of the light beam 15a exceeds the critical angle on the oblique inner surface. For this reason, the prior art non-contact position transducer uses only a part of the light for the detection of key position.

SUMMARY OF THE INVENTION

It is therefore an important object of the present invention to provide a non-contact type position transducer which is simple in arrangement of optical paths and effectively uses light.

It is also an important object of the present invention to provide a positional information processing system which uses the non-contact type position transducer.

To accomplish the object, the present invention proposes to share a light emitting block and a light detecting block between two non-contact type position transducers.

In accordance with one aspect of the present invention, there is provided a non-contact type position transducer for detecting a current position of a moving body, comprising: a light emitting block optically coupled to a light source, and radiating a first light beam along a first optical path extending in a first direction and a second light beam along a second optical path extending in a second direction different from the first direction, a trajectory of the moving body intersecting one of the first optical path and the second optical path; and a light detecting block optically coupled to a light detecting element, and guiding one of the first light beam and the second light beam radiated from the light emitting block and a third light beam radiated from another light emitting block to the light detecting element at different timings.

The light emitting block and the light detecting block may be connected through optical fibers to the light source and the light detecting element, or may have a built-in light source and a built-in light detecting element.

In accordance with another aspect of the present invention, there is provided a positional information processing system for detecting a variation of each of a plurality of moving bodies respectively movable along trajectories, comprising: a plurality of light emitting blocks and a plurality of light detecting blocks alternately arranged between the trajectories, each of the plurality of light emitting blocks respectively radiating a first light beam along a first optical path across one of the trajectories and a second light beam along a second optical path across another of the trajectories, each of the plurality of light detecting blocks receiving the first light beam radiated from one of the plurality of light emitting blocks and the second light beam radiated from another of the plurality of light emitting blocks; a light generating means optically connected to the plurality of light emitting blocks for selectively supplying a photo-pulse to the plurality of light emitting blocks at different timings; a light detecting means optically connected to the plurality of light detecting blocks for converting the first light beam and the second light beam to electric detecting signals at the different timings; and a data processing means supplying an electric driving signal to light generating means so as to cause the light generating means to repeatedly generate the photo-pulse at the different timings, and deciding at least one of the plurality of moving bodies intersecting one of the first light beam and the second light beam on the basis of one of the plurality of light emitting blocks radiating the aforesaid one of the first light beam and the second light beam and one of the plurality of light detecting blocks receiving the aforesaid one of the first light beam and the second light beam.

BRIEF DESCRIPTION OF THE DRAWINGS

The features and advantages of the non-contact type position transducer and the positional information processing system according to the present invention will be more clearly understood from the following description taken in conjunction with the accompanying drawings in which:

FIG. 21 is a circuit diagram showing the arrangement of a switching matrix implemented by the non-contact type position transducers.

DESCRIPTION OF THE PREFERRED EMBODIMENTS

First Embodiment
Non-Contact Type Position Transducer

Figure 1:
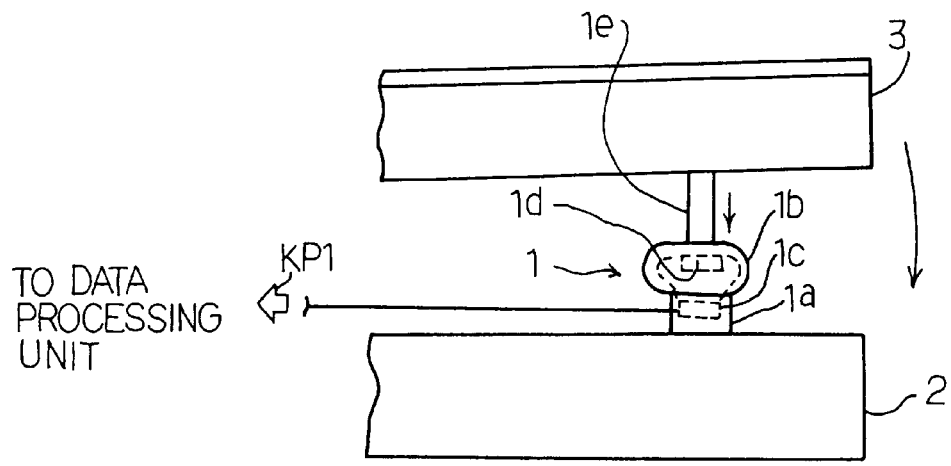
FIG. 1 is a side view showing the prior art contact type position transducer provided for the key of the acoustic piano.
Figure 2:
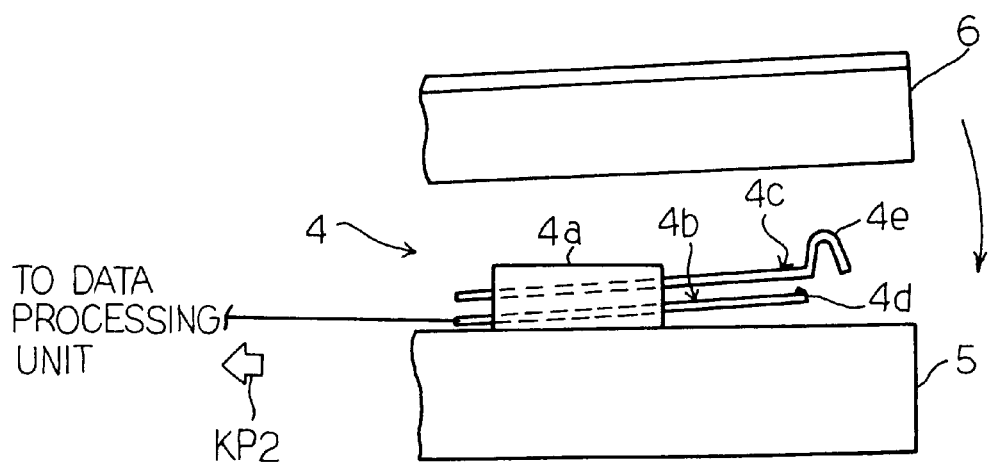
FIG. 2 is a side view showing another prior art contact type position transducer provided for the key of the acoustic piano.
Figure 3:
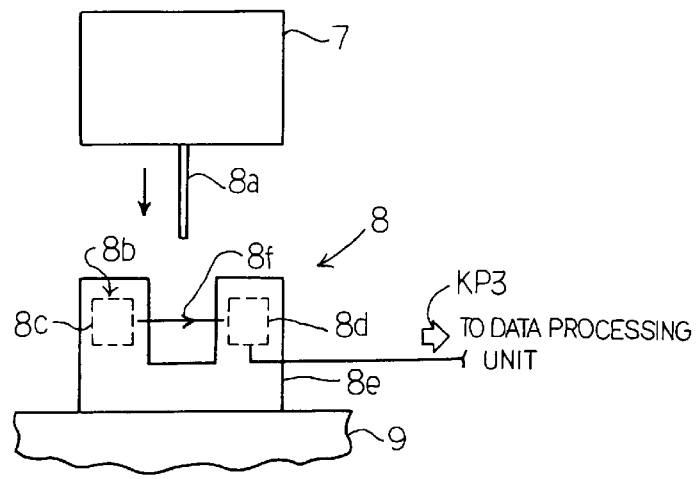
FIG. 3 is a front view showing the prior art non-contact type position transducer.
Figure 4:
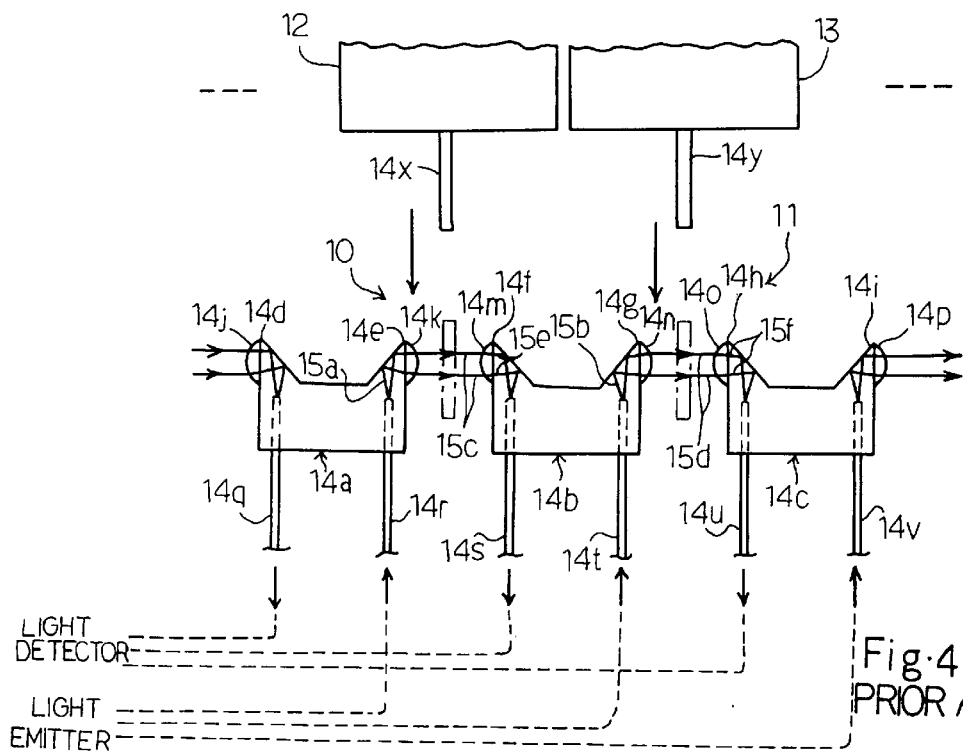
FIG. 4 is a front view showing another prior-art non-contact type position transducer.
Figure 5:
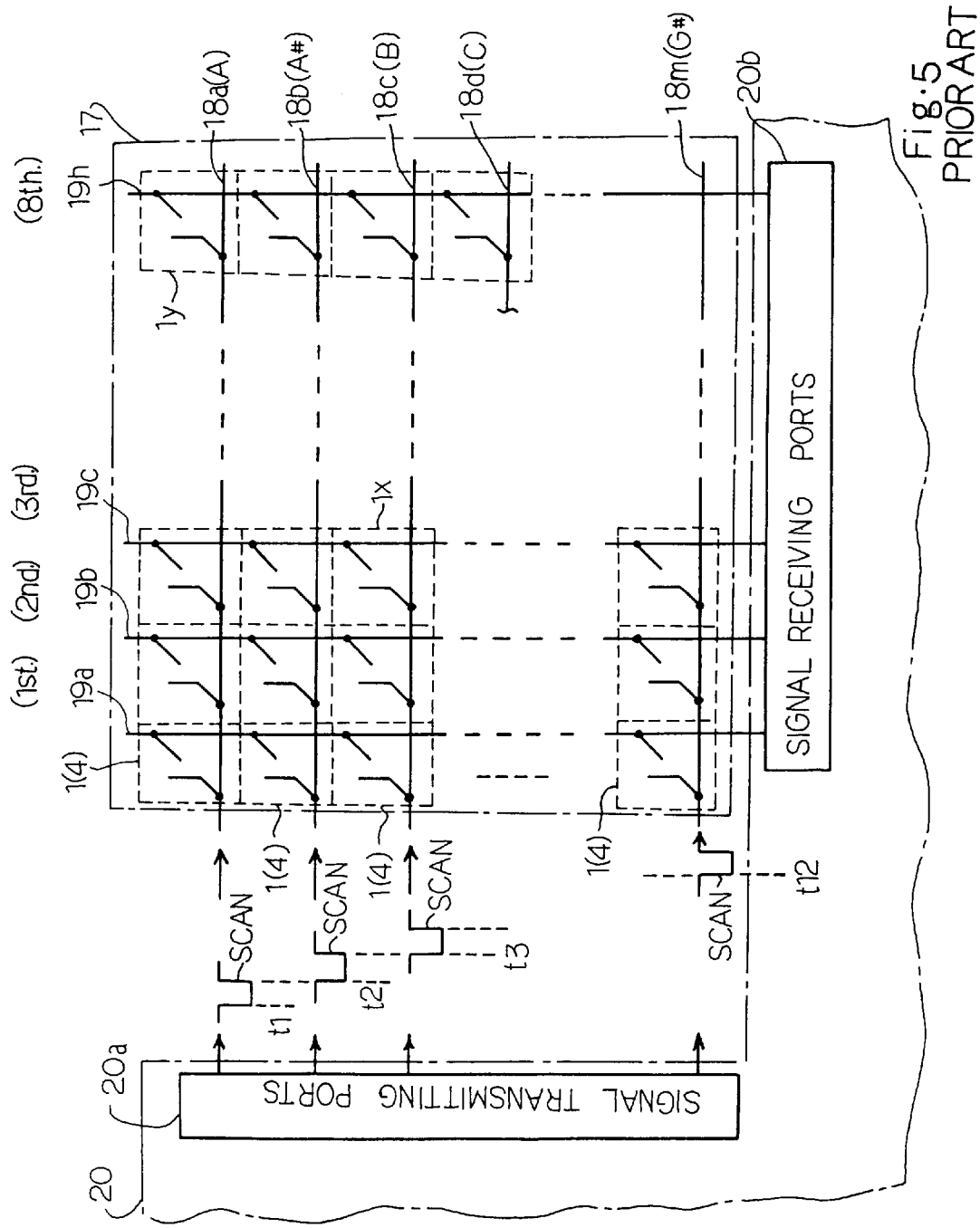
FIG. 5 is a circuit diagram showing the switching matrix implemented by the prior art contact type position transducer.
Figure 6:
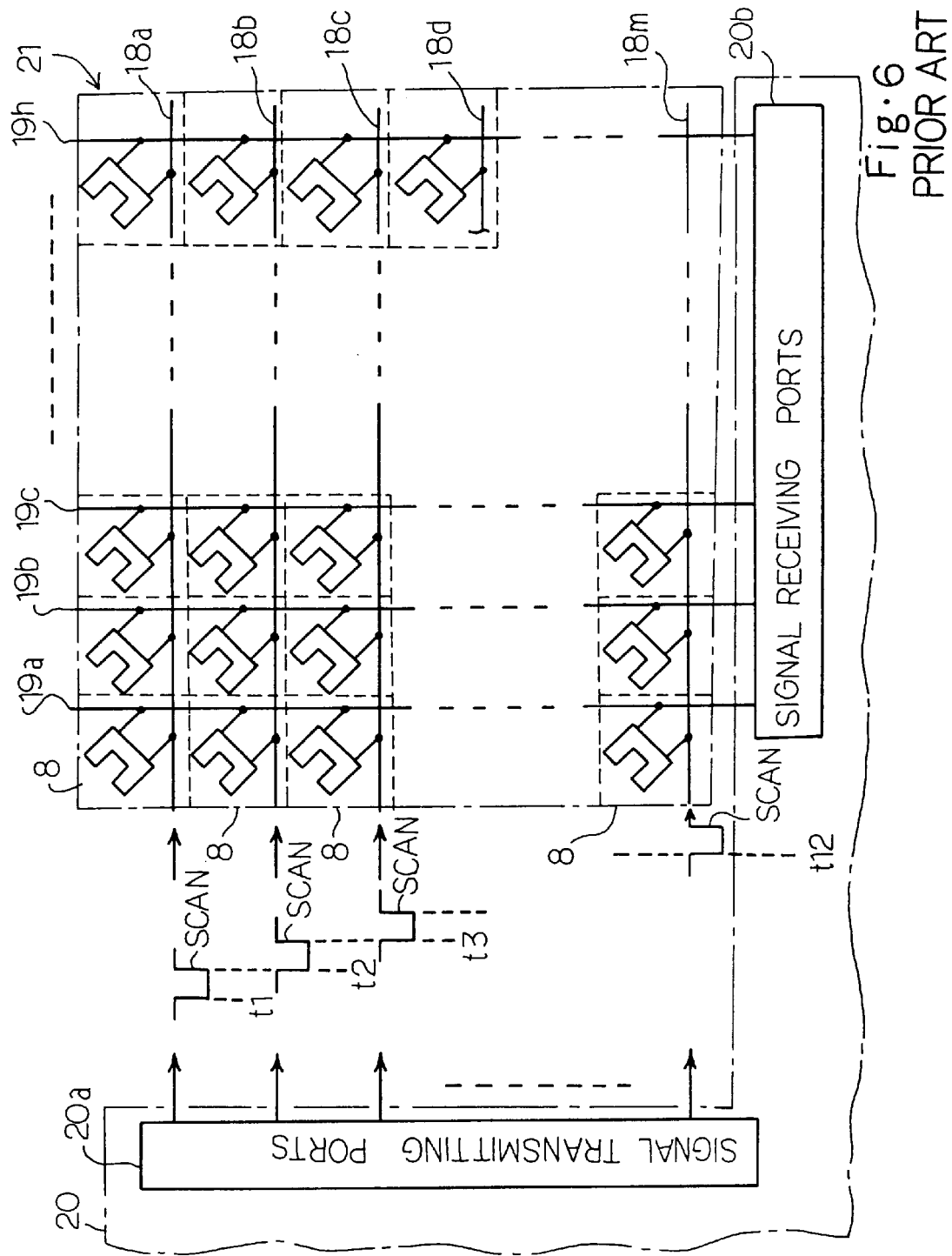
FIG. 6 is a circuit diagram showing the switching matrix implemented by the prior art non-contact type position transducer shown in FIG. 3.
Figure 7:
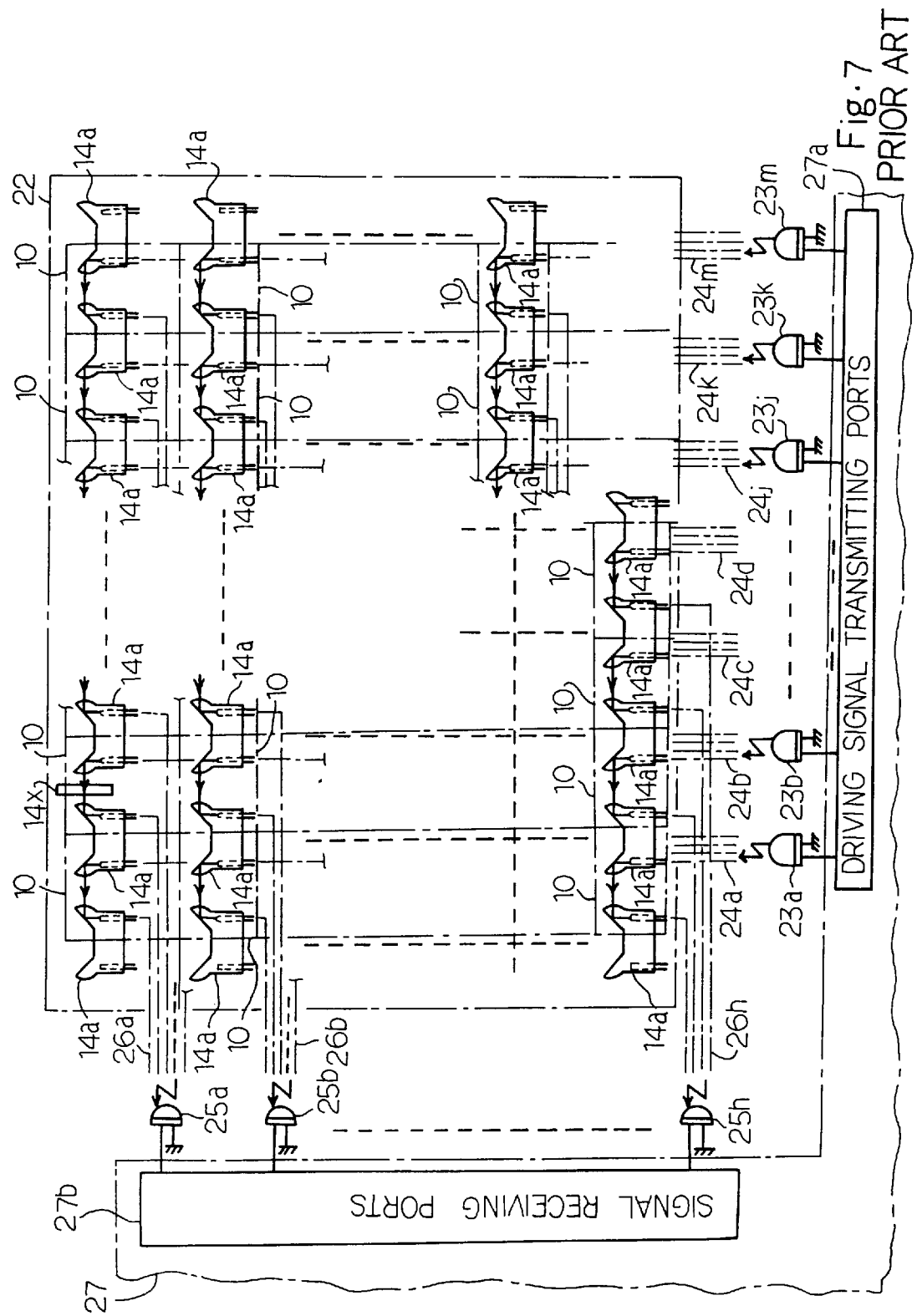
FIG. 7 is a circuit diagram showing the switching matrix implemented by the prior art non-contact type position transducer shown in FIG. 4.
Figure 8:
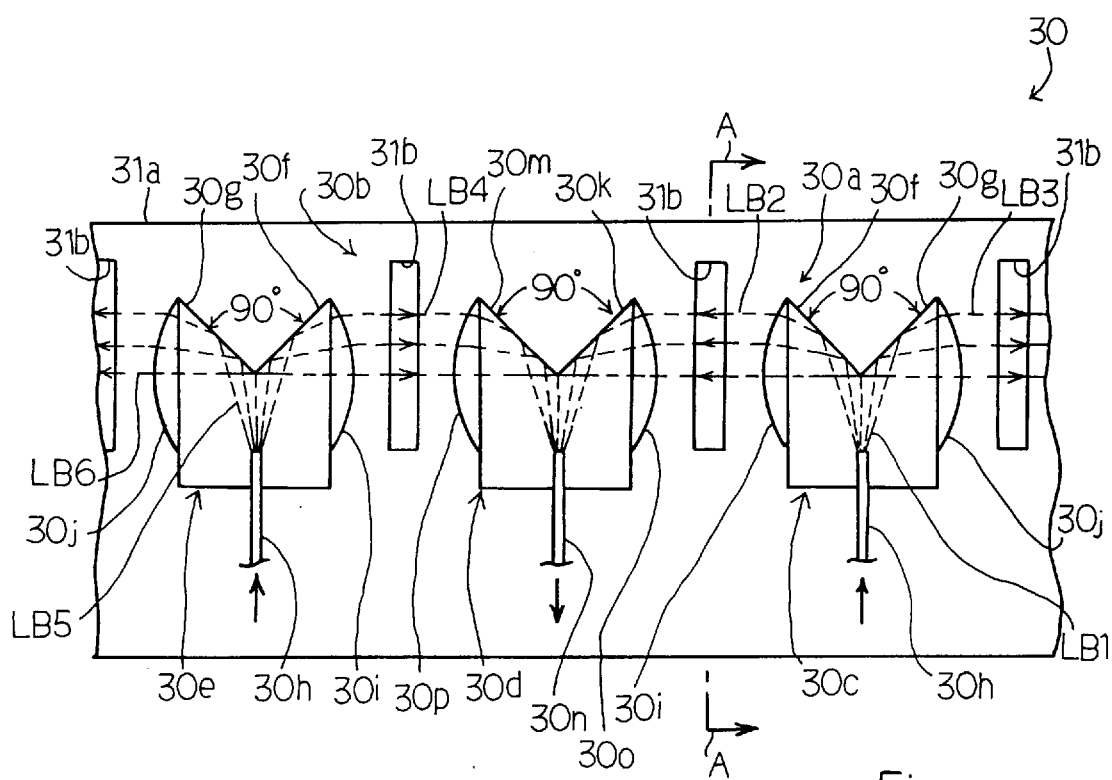
FIG. 8 is a bottom view showing an array of non-contact type position transducers according to the present invention.
Figure 9:
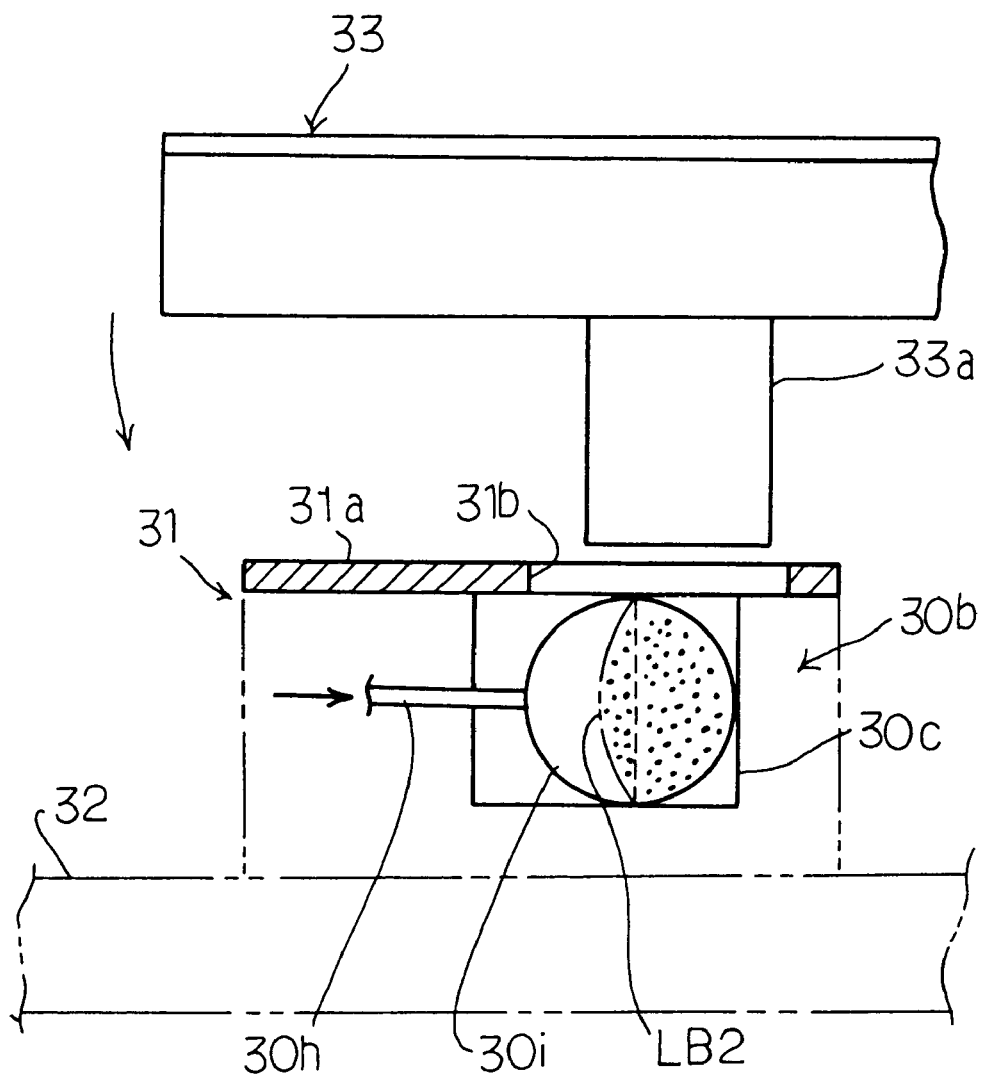
FIG. 9 is a cross sectional view taken along line A—A of FIG. 8 and showing the non-contact type position transducer.

Referring to FIGS. 8 and 9 of the drawings, a non-contact type position transducer 30 embodying the present invention is supported by a frame structure 31, and the frame structure 31 is placed on a key bed 32 under keys 33. The keys 33 are turnable with respect to the key bed 32, and form parts of an acoustic piano incorporated in an automatic player/silent piano. The non-contact position transducers 30 form parts of an information processing system, and the information processing system is incorporated in the automatic player/silent piano. In this instance, the automatic player/silent piano has eighty-eight keys 33, and, accordingly, the eighty-eight non-contact type position transducers 30 are provided under the eighty-eight keys 33.

The frame structure 31 has an upper plate 31a, and slits 31b are formed in the upper plate 31a at intervals. Shutter plates 33a are respectively attached to the lower surfaces of the keys 33, and the shutter plates 33a downwardly project therefrom. The slits 31b are respectively aligned with the shutter plates 33a, and the shutter plates 33a are movable into and out of the slit 31b, respectively. The non-contact position transducers 30 are provided across the slits 31b, and detect shutter positions and, accordingly, key positions.

The non-contact type position transducers 30 are identical in structure to one another, and description is provided on one of the non-contact position transducers 30 labeled with "30a" in FIG. 8. The non-contact type position transducer 30a comprises a light emitting block 30c shared with a non-contact type position transducer 30b on the right side thereof and a light detecting block 30d shared with the non-contact type position transducer 30e.

The light emitting block 30c is attached to the reverse surface of the upper plate 31a between the slits 31b, and is formed of transparent synthetic resin such as, for example, acrylate resin. The transparent synthetic resin block is partially cut away, and the light emitting block 30c has a V-shaped dent. Oblique surfaces joint at one end thereof together at 90 degrees and at the other end thereof with side surfaces at 45 degrees. The side surfaces joint to both ends of an end surface at 90 degrees. As a result, triangle portions are formed between the oblique surfaces and the side surfaces, and serve as prisms 30f and 30g. An optical fiber 30h is inserted into the transparent synthetic resin block, and is directed to the V-shaped dent. The optical fiber 30h is formed of transparent synthetic resin such as, for example, acrylate resin, and is 0.5 millimeter in diameter. The optical axis of the optical fiber 30h is substantially aligned with a bisector of the oblique surfaces. Convex lenses 30i and 30j are attached to the side surfaces, and are faced to the slits 31b.

The optical fiber 30h radiates light beam LB1 toward the prisms 30f and 30g, and the oblique surfaces reflect the light beam toward the convex lenses 30i and 30j. The convex lenses form the light beam LB1 into parallel rays LB2 and LB3. The parallel rays LB2/LB3 proceed across spaces under the slits 31b toward the light detecting block 30d and the light detecting block on the right side of the light emitting block 30c.

The light detecting block 30d is also attached to the reverse surface of the upper plate 31a between the slits 31b, and is formed of transparent synthetic resin such as, for example, acrylate resin. The transparent synthetic resin block is partially cut away as similar to the light emitting block 30c, and the light detecting block 30d has a V-shaped dent. Oblique surfaces joint at one end thereof together at 90 degrees and at the other end thereof with side surfaces at 45 degrees. The side surfaces joint to both ends of an end surface at 90 degrees. As a result, triangle portions are formed between the oblique surfaces and the side surfaces, and serve as prisms 30k and 30m. An optical fiber 30n is inserted into the transparent synthetic resin block, and is directed to the V-shaped dent. The optical fiber 30n is formed of transparent synthetic resin such as, for example, acrylate resin, and is 0.5 millimeter in diameter. The optical axis of the optical fiber 30h is substantially aligned with a bisector of the oblique surfaces. Convex lenses 30o and 30p are attached to the side surfaces, and are faced to the slits 31b.

The parallel rays LB2/LB4 are incident on the convex lenses 30o and 30p, and are converged on the oblique surfaces of the prisms 30k/30m. The light beams LB2 and LB3 are reflected on the oblique surfaces, and are directed to the optical fiber 30n.

The optical fiber 30h of the light emitting block 30c and the optical fiber 30n of the light detecting block 30d are connected to a light emitting element and a light detecting element as will be described hereinbelow, and the reciprocal motion of the associated key 33 is detectable through the variation of light intensity.

Positional Information Processing System

Figure 10:
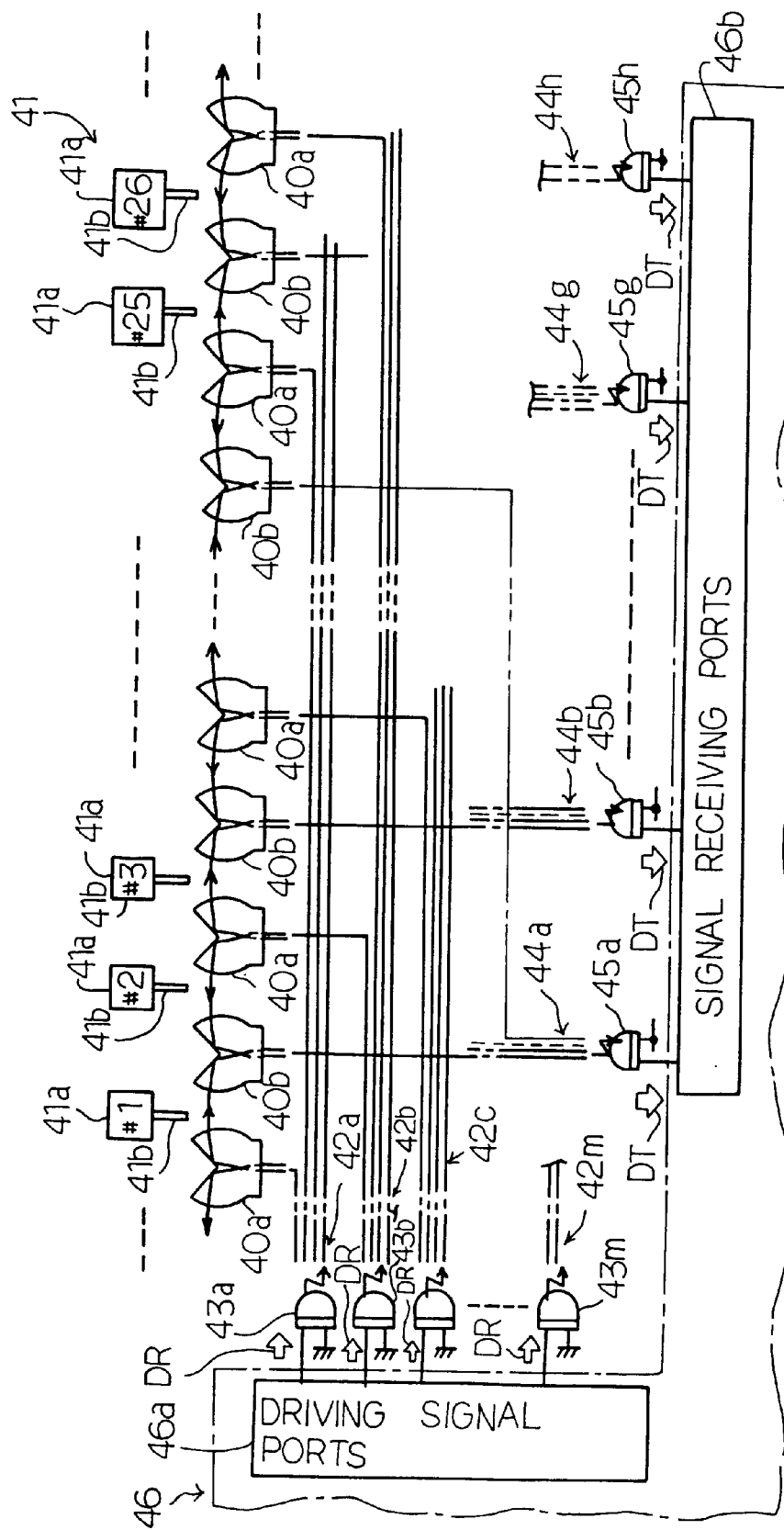
FIG. 10 is a circuit diagram showing the arrangement of a positional information processing system according to the present invention.

Description is hereinbelow made of the positional information processing system embodying the present invention with reference to FIG. 10. The positional information processing system comprises a plurality of light emitting blocks 40a identical with the light emitting block 30c and a plurality of light detecting blocks 40b identical with the light detecting block 30d. The light emitting blocks 40a and the light detecting blocks 40b are alternately arranged under a keyboard 41 consisting of 88 keys 41a.

The positional information processing system further comprises twelve bundles of optical fibers 42a, 42b, 42c, . . . and 42m selectively connected to the light emitting blocks 40a, twelve light emitting elements 43a, 43b, 43c, . . . and 43m respectively connected to the twelve bundles of optical fibers 42a to 42m, eight bundles of optical fibers 44a, 44b, . . . , 44g and 44h selectively connected to the light detecting blocks 40b and eight light detecting elements 45a, 45b, . . . , 45g and 45h respectively connected to the bundles of optical fibers 44a to 44h. The light emitting element and the light detecting element may be implemented by a semiconductor light emitting diode and a semiconductor phototransistor, respectively. The light emitting element is responsive to an electric driving signal DR for producing a photopulse, and the light detecting element produces an electric detecting signal from the light propagated thereto. The potential level of the electric detecting signal DT is proportional to the light intensity.

Forty-five light emitting blocks 40a are incorporated in the positional information processing system, and four optical fibers or three optical fibers constitute one of the twelve bundles 42a to 42m. Six optical fibers or four optical fibers form one of the bundles 44a to 44h, and, accordingly, forty-four optical fibers are selectively connected between the light detecting blocks 40b and the light detecting elements 45a to 45h. Thus, the positional information processing system according to the present invention requires only eighty-nine optical fibers, and the arrangement of optical paths is simpler than that of the prior art.

As described hereinbefore, the light emitting block is shared between adjacent two non-contact type position transducers, and the light detecting block is shared between different adjacent two non-contact type position transducers. The non-contact type position transducer monitors a shutter plate 41b attached to one of the keys 41a, and, accordingly, eighty-eight non-contact type position transducers are incorporated in the positional information processing system. The shutter plate 41b is moved into and out of the slit 31b, and passes through the gap between the light emitting block 40a and the light detecting block 40b. In the following description, key numbers from #1 to #88 are respectively assigned to the keys 41a, and the non-contact type position transducers are also identified by using the key numbers #1 to #88. When it is necessary to specify the light emitting block 40a and the light detecting block 40b in connection with a key, the light emitting block 40a and the light detecting block 40b are suffixed with the key number of the key 41a on the right side thereof. For example, the leftmost light emitting block 42a and the left most light detecting block 40b are specified as "40a#1" and "40b#2", respectively.

Figure 11:
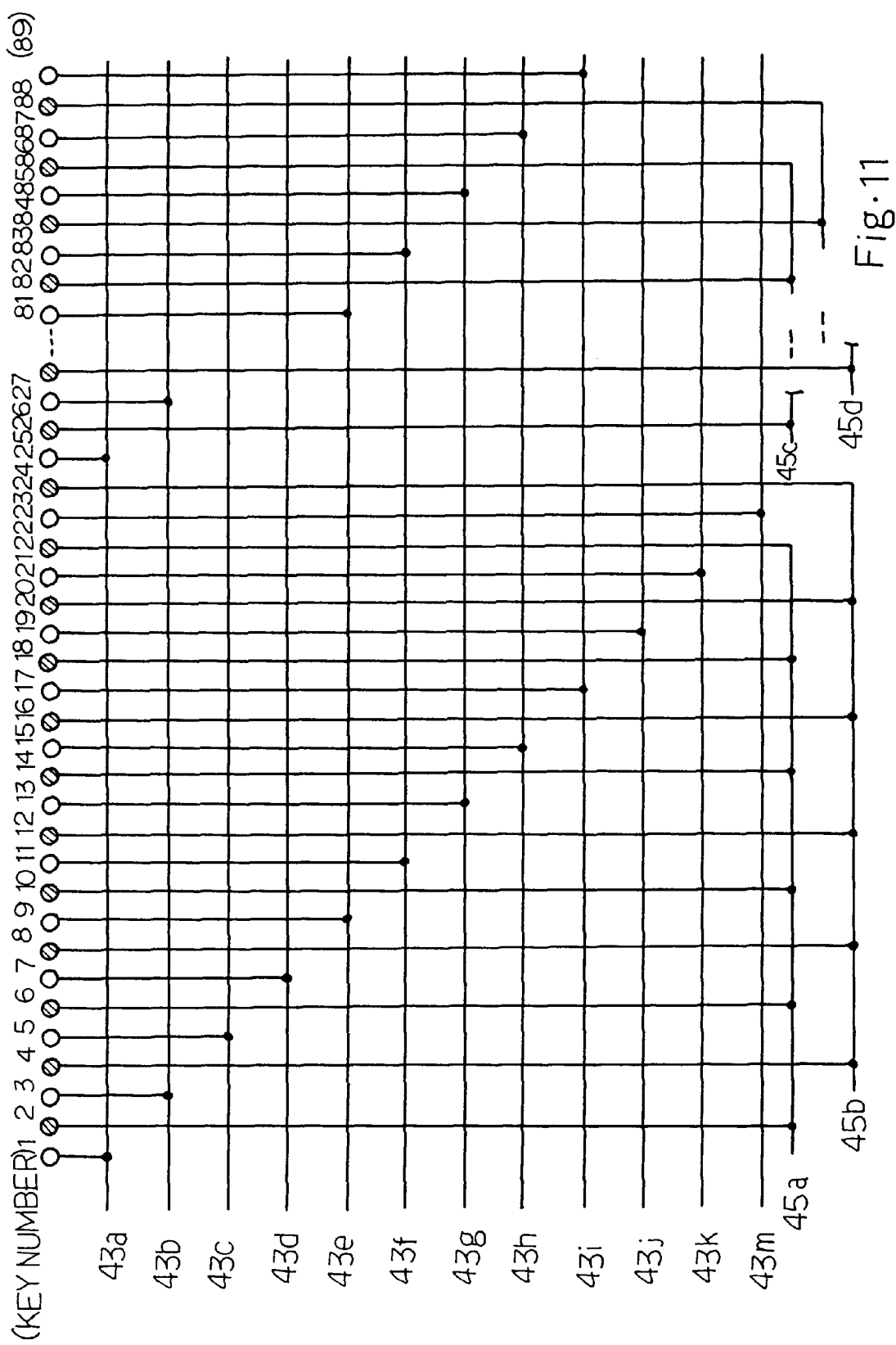
FIG. 11 is a diagram showing the relation between light emitting elements and light emitting blocks incorporated in the positional information processing system.

The light emitting element 43a is, by way of example, connected through the bundle of optical fibers 42a to the light emitting blocks 40a#1, 40a#25, 40a#49 and 40a#73 spaced by 2 octaves. The light emitting element 43b is connected through the bundle of optical fibers 42 to the light emitting blocks 40a#3, 40a#27, 40a#51 and 40a#75. The relationships between the light emitting elements 43a to 43m and the light emitting blocks 40a are summarized in Table 1. In the table, although there is not a key #89 in the keyboard, the rightmost light emitting block 40a is suffixed with #89. The relationships between the light emitting elements 43a to 43m and the light emitting blocks 40a is also illustrated in FIG. 11.

TABLE 1

| Light emitting element | Light emitting blocks |
| --- | --- |
| 43a | #1, #25, #49, #73 |
| 43b | #3, #27, #51, #75 |
| 43c | #5, #29, #53, #77 |
| 43d | #7, #31, #55, #79 |
| 43e | #9, #33, #57, #81 |
| 43f | #11, #35, #59, #83 |
| 43g | #13, #37, #61, #85 |
| 43h | #15, #39, #63, #87 |
| 43i | #17, #41, #65, #89 |

TABLE 1-continued

| Light emitting element | Light emitting blocks |
| --- | --- |
| 43j | #19, #43, #67 |
| 43k | #21, #45, #69 |
| 43m | #23, #47, #71 |

Thus, the light emitting blocks spaced by 2 octaves are connected to one of the light emitting elements 43a to 43m, and the light emitting blocks 40a coupled to one of the light emitting elements 43a to 43m are respectively spaced from the light emitting blocks 40a coupled to the adjacent light emitting element by two key numbers.

Subsequently, the relationship between the light detecting blocks 40b and the light detecting elements 45a to 45h is detailed. The four optical fibers or the six optical fibers are connected between the light detecting blocks 40b and each light detecting element 45a to 45h. The light detecting block 45a is supplied from the light detecting blocks 40b#2, 40b#6, 40b#10, 40b#14, 40b#18 and 40b#22 each spaced from the adjacent light detecting block by four key numbers. Similarly, the light detecting block 45b is supplied from the light detecting blocks 40b#4, 40b#8, 40b#12, 40b#16, 40b#20 and 40b#24, and each light detecting block is different from the adjacent light detecting block by four key numbers. The relationship between the light detecting elements 45a to 45h and the light detecting blocks 40b is summarized in Table 2, and is confirmed from FIG. 11.

TABLE 2

| Light detecting element | Light detecting blocks |
| --- | --- |
| 45a | #2, #6, #10, #14, #18, #22 |
| 45b | #4, #8, #12, #16, #20, #24 |
| 45c | #26, #30, #34, #38, #42, #46 |
| 45d | #28, #32, #36, #40, #44, #48 |
| 45e | #50, #54, #58, #62, #66, #70 |
| 45f | #52, #56, #60, #64, #68, #72 |
| 45g | #74, #78, #82, #86 |
| 45h | #76, #80, #84, #88 |

Thus, every fifth light detecting block 40b is connected to one of the light detecting element 45a to 45h, and the light detecting blocks 40b coupled to one of the light detecting elements 45a to 45h are spaced from the light detecting blocks 40b coupled to the adjacent light detecting element by two key numbers.

The positional information processing system further comprises a data processing unit 46. The data processing unit 46 includes driving signal ports 46a and a signal receiving ports 46b. The data processing unit 46 periodically supplies the electric driving signal DT at different timings from the driving signal ports 46a to the light emitting elements 43a to 43m, and scans the signal receiving ports 46b to see whether or not one of the eighty-eight non-contact type position transducers #1 to #88 detects a depressed key 41a.

The data processing unit 46 is assumed to cause the light emitting element 43a to supply the photo-pulse to the bundle of optical fibers 42a at a certain timing, and the light detecting element 45a is assumed to concurrently decrease the potential level of the electric detecting signal DT. The data processing unit 46 acknowledges that the leftmost key 41a intersects the light beam of the non-contact type position transducer #1, and specifies the key number #1.

Behavior of Positional Information Processing System

The positional information processing system periodically supplies the electric driving signals DR from the driving signal ports 46a to the light emitting elements 43a to 43m. The light emitting elements 43a to 43m are assumed to sequentially generate the photo-pulses at timings t1, t2, . . . and t12, respectively. The photo-pulses are supplied to the bundles of optical fibers 42a to 42m, respectively, and are propagated through the optical fibers 42a to 42m to the associated light emitting blocks 40a. The behavior of the photo-pulses are similar in the light emitting blocks 40a and the light detecting blocks 40b, and, for this reason, description is focused on the light emitting block 40a#1/40a#3 and the light detecting block 40b#2 for the sake of simplicity. The light emitting block 40a#1/40a#3 and the light detecting block 40b#2 are assumed to be corresponding to the light emitting block 30e/30c and the light detecting block 30d shown in FIG. 8. The optical fiber, the prisms and the convex lenses of the light emitting block 30e are labeled with the same references as those of the light emitting block 30c in the following description.

The data processing unit 46 supplies the driving signal DR to the light emitting element 43a at timing t1, and the light emitting element 43a generates the photo-pulse. The photo-pulse generated at timing t1 is propagated through the optical fiber 30h to the light emitting block 30e and the other light emitting blocks, and the light in the optical fiber 30h is formed into the light beam LB5. The light beam LB5 is radiated from the optical fiber 30h toward the prisms 30f and 30g. The light beam LB5 diverges toward the oblique surfaces of the prisms 30f/30g, and the oblique surfaces of the prisms 30f/30g reflect the light beam LB5 toward the convex lenses 30i and 30j. A half of the light beam LB5 is reflected on the oblique surface of the prism 30f, and the other half is incident onto the oblique surface of the other prism 30g. Thus, the prisms 30f/30g are arranged in such a manner as to be symmetrical with respect to the optical axis of the fiber 30h, and the incident angle becomes smaller than the critical angle of 48 degrees. For this reason, most of light is reflected on the oblique surfaces, and forms the light sub-beams.

Although the reflected light sub-beams further diverge after the reflection on the oblique surfaces, the convex lenses 30i and 30j form the reflected light sub-beams into the parallel rays LB4 and LB6. The parallel rays LB4 and LB6 have a kind of semi-circular cross section as similar to the parallel ray LB2 indicated by dots in FIG. 9. The reason why the parallel ray LB2 does not have a perfect semi-circular cross section is that the boundary between the oblique surfaces reflects the light beam LB1 toward the lower half of the convex lens 30i shown in FIG. 8.

The parallel ray LB4 passes through the space under the slit 31b, and is incident into the convex lens 30p. The parallel ray LB4 converges onto the oblique surface of the prism 30m, and is reflected toward the optical fiber 30n. The optical fiber propagates the light toward the light detecting element 45a, and the light detecting element 45a produces the detecting signal DT1 at timing t1.

Subsequently, the data processing unit 46 supplies the driving signal DR from the driving signal ports 46a to the light emitting element 43b at timing t2. The light emitting element 43b generates the photo-pulse, and a part of the photo-pulse generated at timing t2 is propagated through the optical fiber 30h toward the light emitting block 30c. The light is formed into the light beam LB1, and is radiated from the optical fiber 30h toward the prisms 30f and 30g. The light beam LB1 diverges toward the oblique surfaces of the prisms 30f/30g, and the oblique surfaces of the prisms 30f/30g reflect the light beam LB1 toward the convex lenses 30i and 30j. A half of the light beam LB1 is reflected on the oblique surface of the prism 30f, and the other half is incident onto the oblique surface of the other prism 30g.

Although the reflected light sub-beams further diverge after the reflection on the oblique surfaces, the convex lenses 30i and 30j form the reflected light sub-beams into the parallel rays LB2 and LB3. The parallel ray LB2 passes through the space under the slit 31b, and is incident into the convex lens 30o. The parallel ray LB2 converges onto the oblique surface of the prism 30k, and is reflected toward the optical fiber 30n.

The optical fiber propagates the light toward the light detecting element 45a, and the light detecting element 45a produces the detecting signal DT1 at timing t2. The other parallel ray LB3 enters into the light detecting block 40b#4, and causes the light detecting element 45b to produce the electric detecting signal DT at timing t2. Thus, the light beam LB1/LB5 is split into two light sub-beams, and is available for two non-contact type position transducers, and the light detecting block such as 40b#2 is used for receiving the parallel rays LB4 and LB2 at different timings t1 and t2. For this reason, the light emitting blocks 40a and the light detecting blocks 40b are fewer in number than those of the prior art positional information processing system.

When a player depresses one of the keys 41a, the associated shutter plate 41b interrupts the parallel ray crossing the space under the associated slit 31b, and the interruption results in the reduction of the potential level of the detecting signal DT. The data processing unit 46 specifies the depressed key 41a on the basis of the timing for the reduction of the potential level and the light detecting element 45a to 45h which reduces the potential level.

If the key #3 is depressed, the light detecting element 45b reduces the potential level of the electric detecting signal DT at timing t2. The data processing unit 46 selects the light emitting blocks #3, #27, #51 and #75 on the basis of the fact that the electric detecting signal DT reduces the potential level at timing t2. The data processing unit 46 further selects the light detecting blocks #4, #8, #12, #16, #20 and #24 connected to the light detecting element 45b. Only the light detecting block #4 is adjacent to the light emitting blocks supplied with the photo-pulse at timing t2, and the data processing unit 46 specifies the depressed key 41a to be #3. The data processing unit 46 may produce a music data code representative of a key-on for the key #3.

As will be appreciated from the foregoing description, each of the light emitting block and the light detecting block is shared between two non-contact type position transducers at different timings, and the light emitting/light detecting blocks and, accordingly, the optical fibers are fewer. This results in a simple arrangement of the optical paths.

Moreover, the prisms of each light emitting block are arranged in symmetry with respect to the optical axis of the associated optical fiber, and the incident angle becomes smaller than that of the prior art light emitting block. As a result, most of the light is used for the detection.

Figure 12:
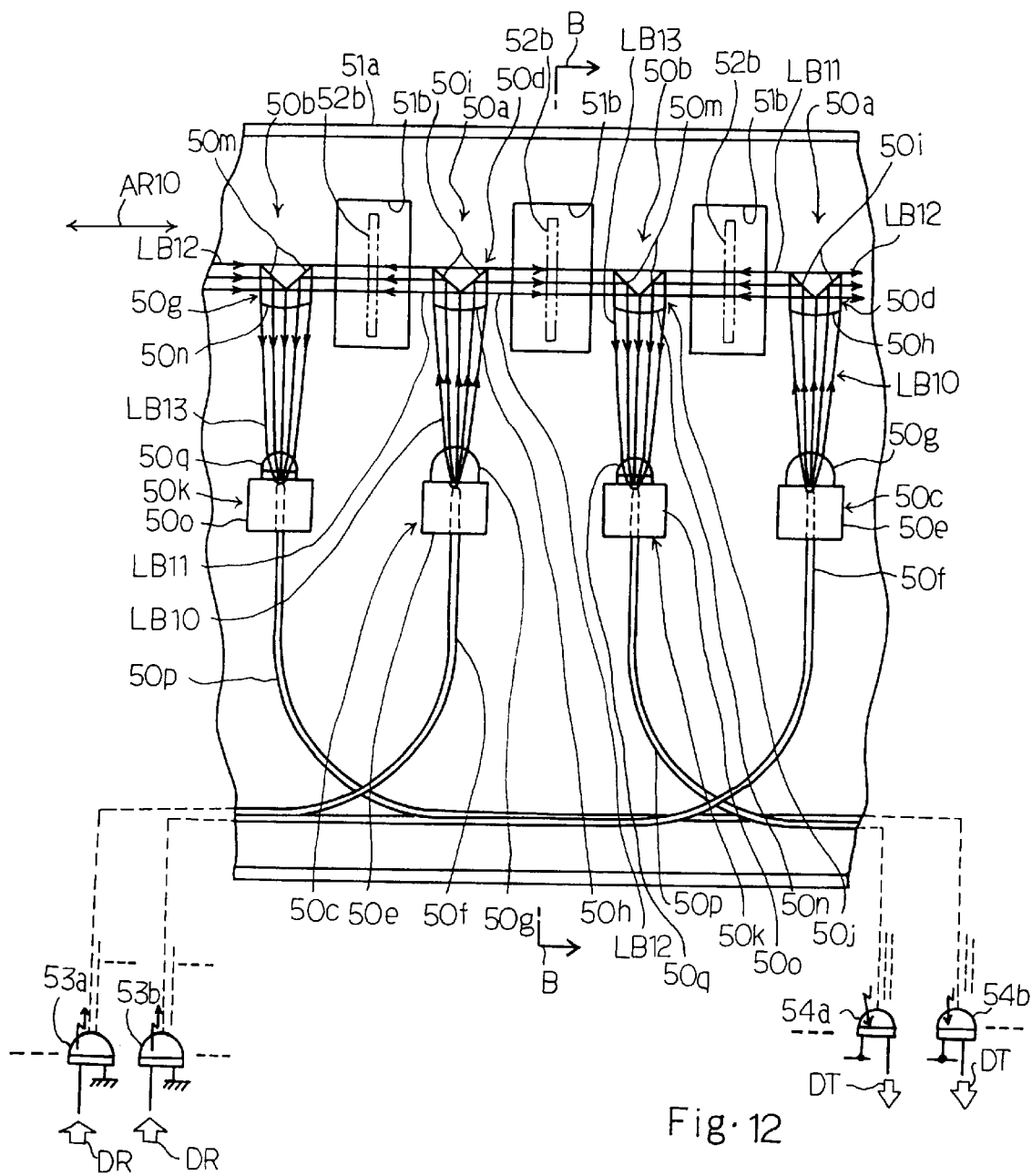
FIG. 12 is a bottom view showing another array of non-contact type position transducers according to the present invention.
Figure 13:
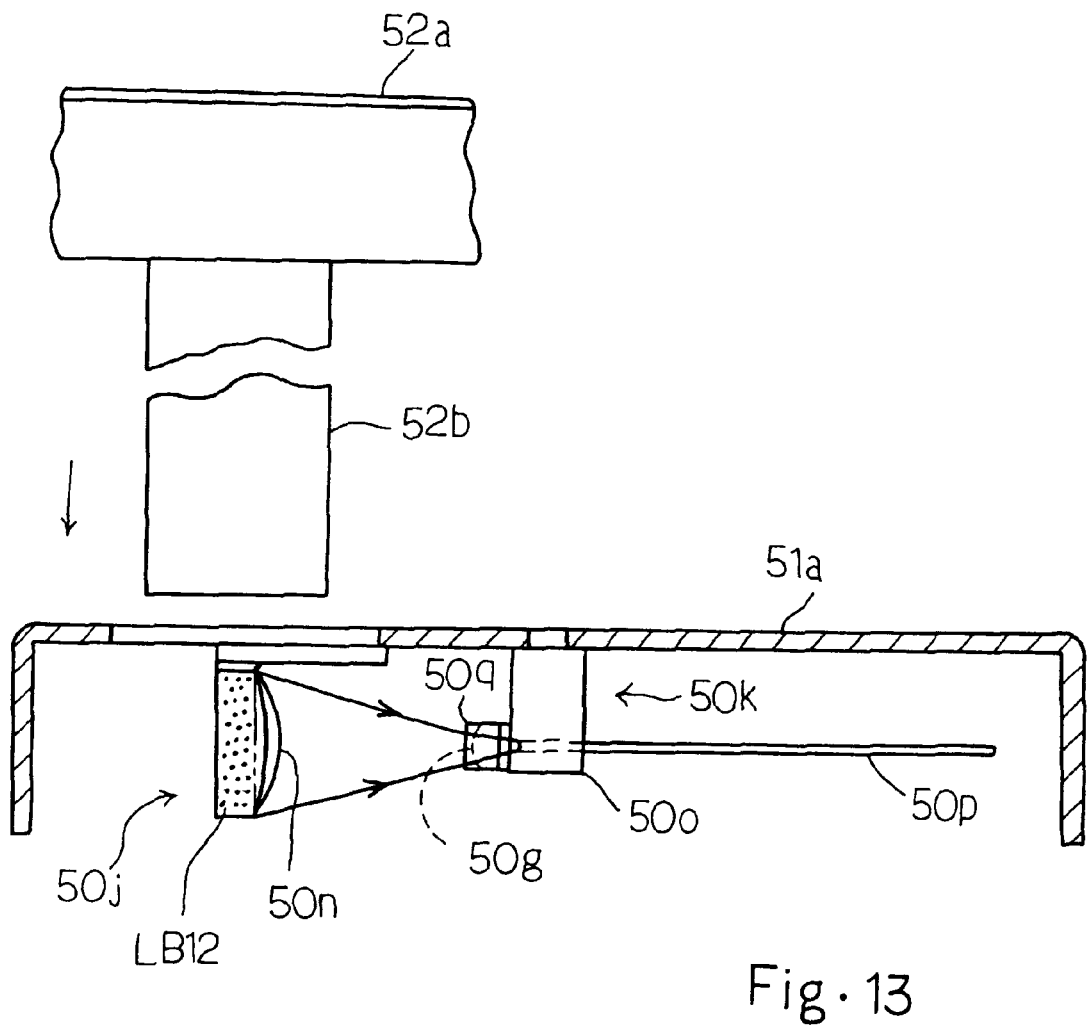
FIG. 13 is a cross sectional view taken along line B—B of FIG. 12 and showing the non-contact type position transducer.

Second Embodiment
Non-Contact Position Transducer & Positional Information Processing System FIGS. 12 and 13 illustrate an array of non-contact type position transducers embodying the present invention, and the array of non-contact type position transducers forms a part of a positional information processing system.

The non-contact type position transducer also comprises a light emitting block 50a and a light detecting block 50b, and the light emitting block 50a and the light detecting block 50b are shared between adjacent two non-contact type position transducers as similar to those of the first embodiment. The light emitting blocks 50a and the light detecting blocks 50b are alternately arranged on the reverse surface of a frame structure 51a, and slits 51b are formed in the frame structure 51a between the light emitting blocks 50a and the light detecting blocks 50b. The slits 51b are spaced from one another in a longitudinal direction of the frame structure 51a indicated by arrow AR10.

The frame structure 51a is placed on a key bed (not shown) under keys 52a of an acoustic piano, and shutter plates 52b are respectively attached to the lower surfaces of the keys 52a. The slits 51b are respectively associated with the keys 52a, and the shutter plates 52b are moved into and out of the associated slits 51b.

Each of the light emitting blocks 50a is separated into a radiating sub-block 50c and a splitting sub-block 50d. The splitting block 50d is provided between the slits 51b, and the radiating sub-block 50c is spaced from the radiating sub-block 50c in a transverse direction perpendicular to the longitudinal direction.

The radiating sub-block 50c includes a fiber support 50e attached to the frame structure 51a, an optical fiber 50f supported by the fiber support 50e and a convex lens 50g attached to a front surface of the fiber support 50e. The optical fiber 50f radiates an optical beam LB10 from the outlet end thereof through the convex lens 50g toward the splitting sub-block 50d. The convex lens 50g prevents the light from divergency.

The splitting sub-block 50d is formed of transparent material such as, for example, acrylate resin. The splitting sub-block 50d has a convex surface 50h opposed to the convex lens 50g and a bifurcated portion serving as prisms having oblique surfaces 50i. The oblique surfaces are jointed to one another at 90 degrees, and the convex surface 50h has a generally rectangular periphery in this instance.

The light beam LB10 is incident onto the convex surface 50h, and is reflected on the oblique surfaces 50i. The light beam LB10 is split into parallel rays LB11/LB12, and the parallel rays LB11/LB12 are directed across the spaces under the slits 51b to the light detecting blocks 50b. Thus, each of the light emitting blocks 50a supplies the parallel rays LB11 and LB12 to the light detecting blocks 50b of two different non-contact type position transducers.

Each of the light detecting blocks 50b is separated into a reflecting sub-block 50j and an intake sub-block 50k. The reflecting sub-block 50j is provided between the slits 51b, and the intake sub-block 50k is spaced from the reflecting sub-block 50j in the transverse direction as similar to the light emitting block 50a.

The reflecting sub-block 50j is formed of transparent material such as, for example, acrylate resin. The reflecting sub-block 50j has a bifurcated portion serving as prisms having oblique surfaces 50m and a convex surface 50n opposed to the intake sub-block 50k. The oblique surfaces 50m are jointed to one another at 90 degrees.

The parallel rays LB11 and LB12 are reflected on the oblique surfaces 50m, and pass through the convex surface 50n toward the intake sub-block 50k. The light beam LB13 is converged toward the intake sub-block 50k.

The intake sub-block 50k includes a fiber support 50o attached to the reverse surface of the frame structure 51a, an optical fiber 50p supported by the fiber support 50o and a convex lens 50q attached to the surface opposed to the reflecting sub-block 50j. The optical fiber 50p is connected to one of light detecting elements 54a, 54b, . . . , and the connection between the light emitting elements 54a, 54b, . . . and the optical fibers 50p is similar to that of the first embodiment. The light emitting element may be implemented by a semiconductor light emitting diode.

The light beam LB13 is incident onto the convex lens 50q, and is focused on the inlet end of the optical fiber 50p. The optical fiber 50p propagates the light to one of the light detecting elements 54a, 54b, . . . , and the light detecting element 54a, 54b, . . . converts the light to an electric detecting signal DT. Thus, each of the light detecting blocks 50b receives the parallel rays LB11 and LB12 from the light emitting blocks 50a of two different non-contact type position transducers. The light detecting element may be implemented by a two different light emitting transistor.

The light emitting elements 53a, 53b, . . . and the light detecting elements 54a, 54b, . . . are respectively connected to driving signal transmitting ports and signal receiving ports of a data processing unit (not shown), and the data processing unit is similar to that of the first embodiment, and no further description is hereinbelow incorporated.

Behavior of Positional Information Processing System

A data processing unit (not shown) periodically supplies a photo-pulse from the driving signal transmitting ports to the light emitting elements 53a, 53b, . . . at different timings, and scans the signal receiving ports to see whether or not the detecting signal decreases the potential level at any timing. The data processing unit determines a key 52a which varies the position as similar to the data processing unit of the first embodiment, and description is focused on one of the non-contact type position transducers for the sake of simplicity.

Assuming now that the data processing unit (not shown) supplies the driving signal DR to the light emitting element 53a, the light emitting element 50a generates the photo-pulse from the electric driving signal DR, and the photo-pulse is branched into the optical fibers 50f. One of the optical fibers 50f is terminated at the fiber support 50e of the radiating sub-block 50c next to the leftmost intake sub-block 50k shown in FIG. 12, and the light beam LB10 is radiated through the convex lens 50g toward the splitting sub-block 50d. The light beam LB10 diverges toward the splitting sub-block 50d. However, the radiating angle is different between the vertical direction normal to the bottom surface of the frame structure 51a and the lateral direction in parallel to arrow AR10, and the divergent angle in the vertical direction is larger than that in the lateral direction. For this reason, the light beam LB10 has an elliptical cross section.

The distance between the fiber support 50e and the convex surface 50h is appropriately selected in such a manner that the outer periphery of the convex surface 50h is inscribed in the elliptical cross section. For this reason, the parallel rays LB11 and LB12 have a rectangular cross section as indicated by dots in FIG. 13. The light beam LB10 is equally split into the parallel rays LB11 and LB12.

The parallel ray LB12 passes through the space under the slit 51b, and is incident into the prism of the reflecting sub-block 50j of the adjacent light detecting block 50b. The parallel ray LB12 is reflected on the oblique surface 50m, and is directed through the convex surface 50n toward the convex lens 50q. The reflection on the oblique surface 50m is a total reflection.

The light beam LB13 converges toward the convex lens 50g, and the convex lens 50g focuses the light beam LB13 on the inlet end of the optical fiber 50p. The optical fiber 50p propagates the incident light to the light detecting element 54a, and the light detecting element 54a converts the light to the electric detecting signal DT.

If the key 52a stays in the rest position, the shutter plate 52b is over the frame structure 51a, and the parallel ray LB12 is never interrupted by the shutter plate 52b. As a result, the light intensity at the light detecting element 54a is strong, and the electric detecting signal 54a has a high potential level. On the other hand, while a player is depressing the key 52a, the shutter plate 52b interrupts the parallel ray LB12, and gradually increases the interrupting area. The photo-pulse is supplied to the optical fiber 50f at an extremely narrow interval, and a plurality of light beams LB10 are radiated toward the splitting sub-block 50d during the downward motion of the shutter plate 52b. The light intensity is gradually decreased, and, accordingly, the electric detecting signal lowers the potential level. Thus, the data processing unit (not shown) not only specifies the depressed key 52a but also determines the current key position gradually varied together with the shutter plate 52b. The data processing unit further calculates the key velocity on the basis of time interval consumed by the depressed key 52a moved between the two key positions.

As will be appreciated from the foregoing description, the non-contact type position transducer shown in FIGS. 12 and 13 achieves all the advantages of the first embodiment. Moreover, the positional information processing system repeats the photo-pulse at the extremely narrow interval, and a plurality of parallel rays LB12 pass through the space under the slit 51b during the downward motion of the shutter plate after entry into the slit 51b. The parallel rays LB11/LB12 elongated in the vertical direction allow the positional information processing system to exactly determine the current position of the shutter plate and, accordingly, the current key position along the trajectory of the depressed key 52a, and the positional information processing system can calculate the key velocity without a multiplication of the non-contact type position transducer.

Third Embodiment

Figure 14:
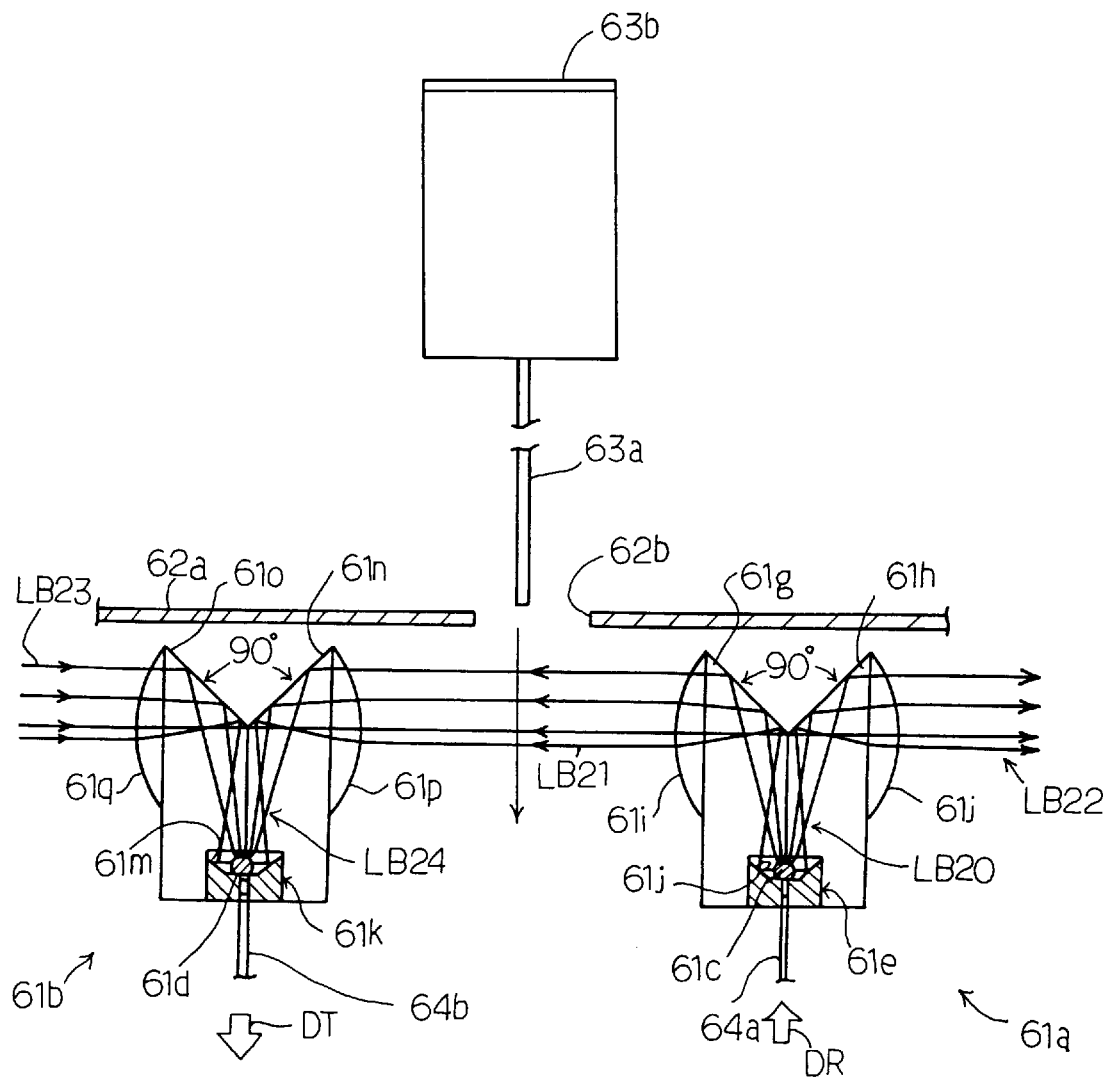
FIG. 14 is a front view showing another non-contact type position transducer according to the present invention.

FIG. 14 illustrates a light emitting block 61a and a light detecting block 61b incorporated in a positional information processing system embodying the present invention. The light emitting block 61a and the light detecting block 61b form in combination a non-contact type position transducer. Though not shown in FIG. 14, the light emitting blocks 61a are alternated with the light detecting blocks 61b, and a plurality of non-contact type position transducers form a switching matrix as will be described hereinlater. The light emitting block 61a is shared between the non-contact type position transducer and another non-contact type position transducer, and the light detecting block 61b is also shared between the non-contact type position transducer and yet another non-contact type position transducer. The light emitting/light detecting blocks 61a/61b are supported by a frame structure 62a, and one of slits 62b is assigned to the light emitting/light detecting blocks 61a/61b. A shutter plate 63a is attached to a lower surface of a key 63b of an acoustic piano, and is moved into and out of the slit 62b.

The light emitting block 61a and the light detecting block 61b have a built-in light emitting element 61c and a built-in light detecting element 61d, respectively. The built-in light emitting element 61c and the built-in light detecting element 61d may be implemented by a semiconductor light emitting diode and a semiconductor light detecting transistor, respectively.

The light emitting block 61a is formed of transparent material, and includes a retainer 61e embedded in the lower portion thereof. It is preferable for the light emitting block 61a to have a visual light cutting filter, because the visual light cutting filter blocks the light propagated in the transparent material from external light. A semi-spherical recess 61f is formed in the retainer 61e, and the light emitting element 61c is fixed to the center of the semi-spherical surface forming the recess 61f. The light emitting block 61a further includes prisms 61g and 61h having oblique surfaces jointed at 90 degrees and convex lenses 61i and 61j attached to the side surfaces thereof.

On the other hand, the light detecting block 61b is also formed of transparent material, and includes a retainer 61k embedded in the lower portion thereof. It is also preferable for the light detecting block 61b to have a visual light cutting filter. A semi-spherical recess 61m is formed in the retainer 61k, and the light detecting element 61d is fixed to the center of the semi-spherical surface forming the recess 61m. The light detecting block 61b further includes prisms 61n and 61o having oblique surfaces jointed at 90 degrees and convex lenses 61p and 61q attached to the side surfaces thereof.

A data processing unit (which is described in connection with FIG. 21) is connected through a lead wire 64a to the light emitting element 61c, and an electric driving signal DR is periodically supplied to the light emitting element 61c. The light emitting element 61c generates light LB20. The light LB20 partially proceeds directly to the prisms 61g/61h, and is partially reflected on the semi-spherical convex surface toward the prisms 61g and 61h. Thus, the light beam LB20 is split into two light sub-beams, and the convex lenses 61g and 61h convert the light sub-beams to parallel rays LB21 and LB22.

The parallel ray LB21 passes through a space under the slit 62b. The parallel ray LB22 is directed to a light detecting block 61b on the right side thereof. Another light emitting block radiates a parallel ray LB23 at different timing from the parallel ray LB21.

The parallel ray LB21 or LB23 is incident onto the convex lens 61p or 61q, and is reflected on the oblique surface of the prism 61n or 61o toward the light detecting element 61d. The reflected light LB24 converges toward the light detecting element 61d, and the light detecting element 61d converts the light beam LB24 to an electric detecting signal DT.

In this situation, if the key 63b is depressed downwardly, and the shutter plate 63a interrupts the parallel ray LB21. The shutter plate 63a varies the light intensity incident into the light detecting block 61b, and the light detecting element 61d changes the potential level of the detecting signal DT depending upon the area of the shutter plate 63a overlapped with the parallel ray LB21.

The light emitting block 61a and the light detecting block 61b are shared between the non-contact type position transducers, and makes the arrageemnt of lead wires 64a/64b simpler than that of the prior art. The built-in light emitting element 61c and the built-in light detecting element 61d convert the signals between the electric energy and the optical energy at a high efficiency, and form a switching matrix through the lead wires 64a/64b printed on a circuit board (not shown). For this reason, the positional information processing system decreases the electric power consumption, and the assembling work is simple.

Figure 15:
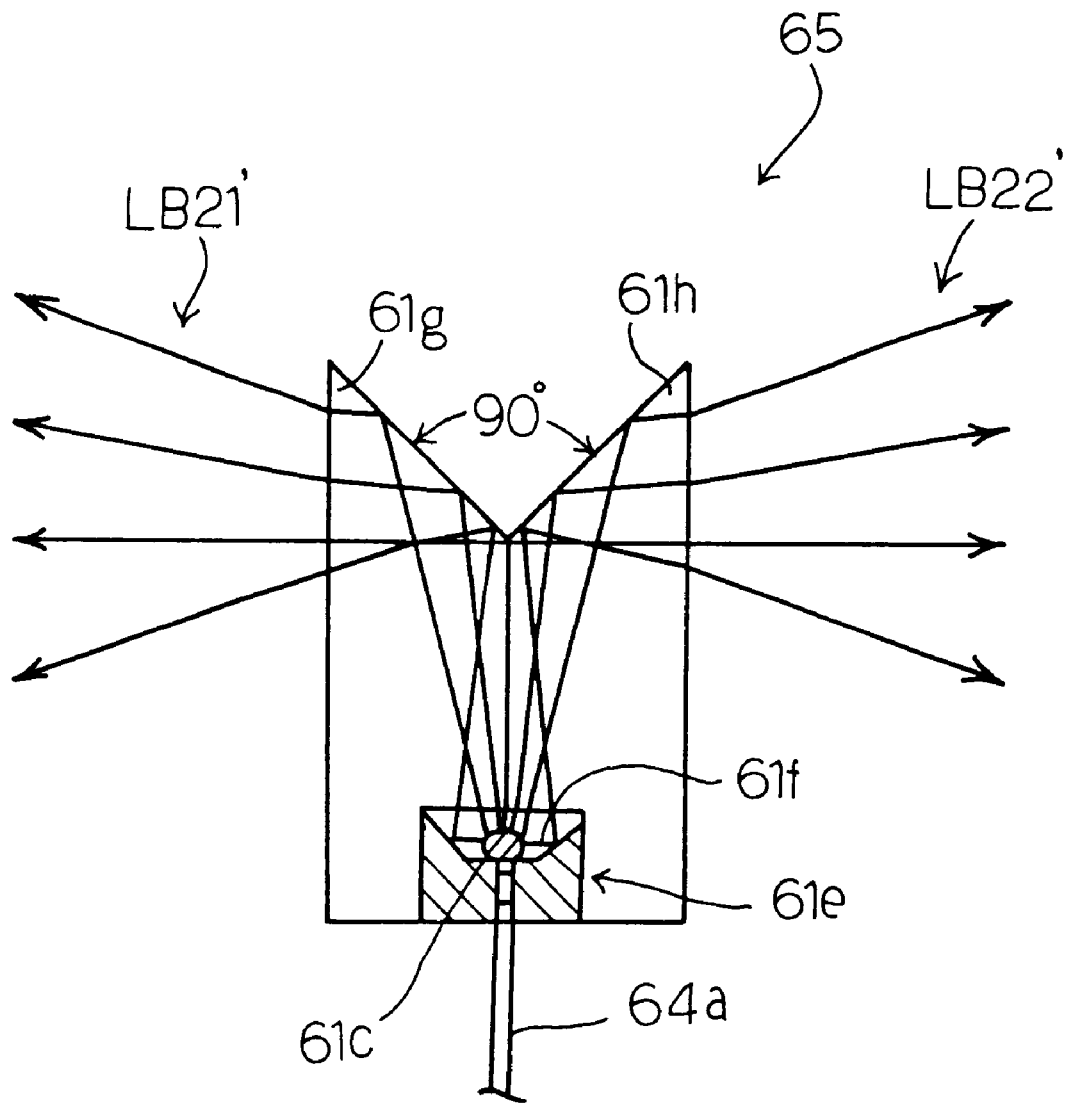
FIG. 15 is a front view showing a modification of the light emitting block forming a part of the non-contact type position transducer shown in FIG. 14.

FIG. 15 illustrates a first modification 65 of the light emitting block 61a. The light emitting block 65 does not have a convex lens on the side surfaces, and the other features are similar to those of the light emitting block 61a. For this reason, the reflected light beams LB21' and LB22' diverge from the prisms 61g and 61h toward the outside thereof.

Figure 16:
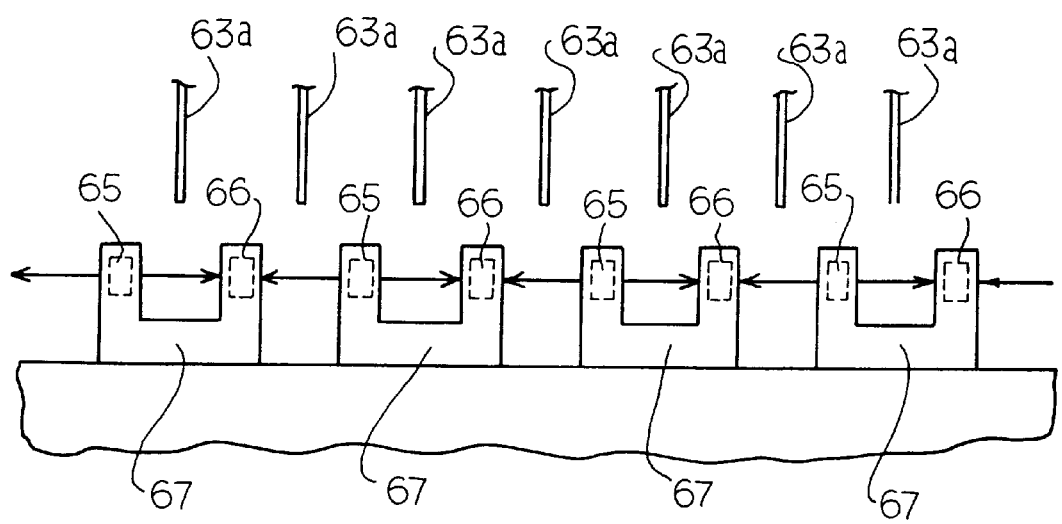
FIG. 16 is a front view showing the modifications housed in black casings.
Figure 17:
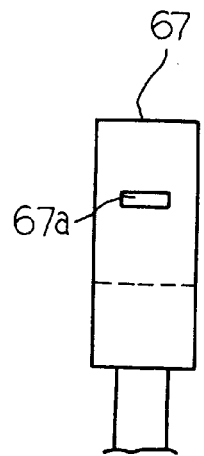
FIG. 17 is a side view showing the block casing.

In order to restrict the divergence, the light emitting block 65 and a light detecting block 66 corresponding to the block 65 may be housed in a U-shaped black casing 67 as shown in FIG. 16. The U-shaped black casing 67 does not allow external light to enter into the inside space. The U-shaped black casing 67 has a slit 67a (see FIG. 17), and the light beams LB21' and LB22' pass through the slits 67a so as not to diverge toward the light detecting block 66. Though not shown in the drawings, the light beams LB21' and LB22' pass through slits formed on the opposite side of the slits 67a, and are incident onto the flat side surfaces of the light detecting blocks 66. The slits keep the amount of light beams LB21' and LB22' incident onto the flat side surfaces of the light detecting blocks 66.

Figure 18:
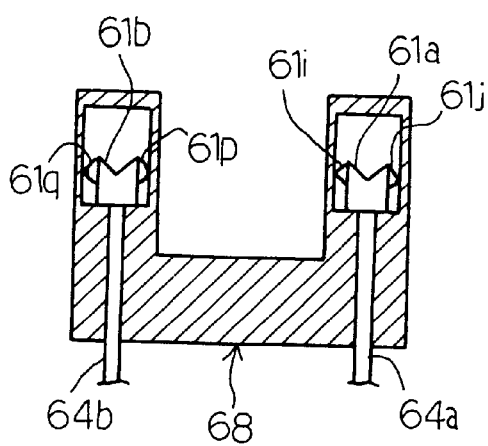
FIG. 18 is a cross sectional view showing a black casing available for the non-contact type position transducer shown in FIG. 14.

The light emitting block 61a and the light detecting block 61b may also be housed in a U-shaped black casing 68 as shown in FIG. 18. In this instance, the light emitting element 61a radiates the parallel rays LB21 and LB22 toward the light detecting elements 61b, and, for this reason, the light emitting block 61a is exposed through a wide window 68a (see FIG. 19) to the outside of the U-shaped black casing 68.

Figure 20:
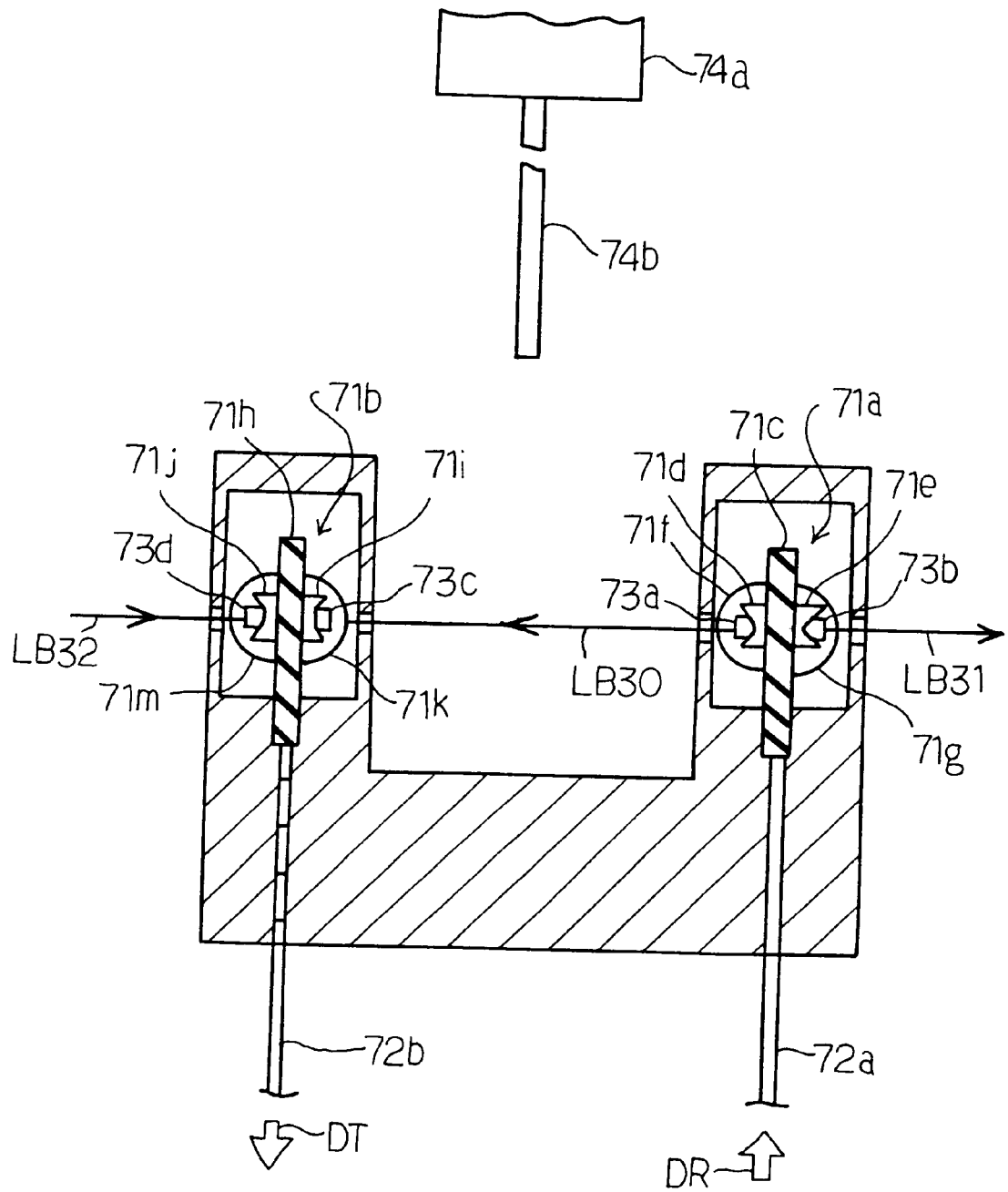
FIG. 20 is a cross sectional view showing a second modification housed in a casing.

FIG. 20 illustrates the second modification of the non-contact type position transducer shown in FIG. 14. A light emitting block 71a and a light detecting block 71b form a non-contact type position transducer together, and further constitute other non-contact type position transducers together with a light detecting block on the right side and a light emitting block on the left side.

The light emitting block includes a printed circuit board 71c connected to a lead wire 72a, a pair of retainers 71d/71e attached to both major surfaces of the printed circuit board 71c and convex lenses 71f/71g covering the retainers 71d/71e, respectively, and the retainers 71d/71e have semi-spherical surfaces forming concaves. Light emitting elements 73a/73b are placed at the centers of the semi-spherical surfaces, and an electric driving signal DR energizes the light emitting elements 73a/73b so as to generate light. The light is radiated through the convex lenses 71f/71g toward the light detecting elements, and the convex lenses 71f/71g form parallel rays LB30/LB31.

The light detecting block 71b also includes a printed circuit board 71h connected to a lead wire 72b, a pair of retainers 71i/71j attached to both major surfaces of the printed circuit board 71h and convex lenses 71k/71m covering the retainers 71i/71j, respectively, and the retainers 71i/71j have semi-spherical surfaces forming concaves. The convex lenses 71k and 71m converge the parallel rays LB30/LB32 toward the light detecting elements 73c/73d placed at the centers of the semi-spherical surfaces. The parallel rays LB30 and LB32 are incident onto the light detecting elements 73c/73d at different timings. The light detecting element 73c/73d converts the parallel rays LB30/LB32 to an electric detecting signal DT.

In this situation, if a key 74a is depressed downwardly, the shutter plate 74b attached to the lower surface of the key 74a intersects the parallel ray LB30, and the light detecting element 73c decreases the potential level of the electric detecting signal DT depending upon the area of the shutter plate 74b overlapped with the parallel ray LB30.

Switchinq Matrix

Any one of the non-contact type position transducers shown in FIGS. 14, 15 and 20 is available for forming a switching matrix shown in FIG. 21. A light emitting block 81a and a light detecting block 81b correspond to one of the light emitting blocks 61a/65/71a and one of the light detecting blocks 61b/66/71b, respectively. The light emitting block 81a and the light detecting block 81b are housed in the U-shaped block casing 81c. Although the U-shaped block casings 81c are arranged on a line as shown in FIG. 16, FIG. 21 shows the U-shaped block casings 81c are obliquely bridged between driving signal lines 82a to 82m and detecting signal lines 83a to 83h so as to make the relationship between the driving signal lines 82a to 82m and the detecting signal lines 83a to 83h. Each of the non-contact type position transducers are specified by the combination of one of the driving signal lines and one of the detecting signal lines, and the non-contact type position transducers are labeled with key numbers #1, #2, . . . #78, #79, . . .

The driving signal lines 82a to 82m are connected to signal transmitting ports 84a of a data processing unit, and the detecting signal lines 83a to 83h are connected to signal receiving ports 84b of the data processing unit.

The data processing unit periodically supplies the electric driving signal DR from the signal transmitting ports 84a to the driving signal lines 82a to 82m at different timings t1, t, t3, . . . , t11 and t12, and scans the signal receiving ports 84b to see whether or not the detecting signal DT of low potential level takes place. Each of the driving signal lines 82a to 82m is connected to three or four light emitting blocks 81a as described in connection with Table 1. For example, the detecting line 82a is connected to the light emitting blocks associated with the keys #1, #25, #49 and #73, and the detecting signal line 82b is connected to the light emitting blocks associated with the keys #3, #27, #51 and #75. Thus, the light emitting blocks 81a concurrently check the three of four keys each spaced by two octaves to see whether or not any one of the keys changes the position.

Each of the detecting signal lines 83a to 83h is connected to four or six light detecting blocks 81b as described in connection with Table 2. For example, the detecting signal line 83a is connected to the light detecting blocks associated with the keys #2, #6, #10, #14, #18 and #22, and the detecting signal line 83b is connected to the light detecting blocks associated with the keys #4, #8, #12, #16, #20 and #24. Thus, the keys connected to each detecting line is spaced by four key numbers.

The non-contact type position transducers are responsive to the driving signal DR, and supply the detecting signal DT to the signal receiving ports 84b at the timings substantially concurrent with t1 to t12, and the data processing unit specifies the key or keys changing the key position on the basis of the timing of the detecting signal DT on selected one or ones of the detecting lines.

Although particular embodiments of the present invention have been shown and described, it will be obvious to those skilled in the art that various changes and modifications may be made without departing from the spirit and scope of the present invention.

Figure 19:
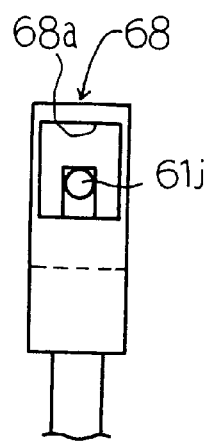
FIG. 19 is a side view showing the black casing shown in FIG. 18.

For example, the casings shown in FIGS. 18 and 19 are available for the light emitting block and the light detecting block shown in FIG. 8, 14 or 15.

The light emitting block and the light detecting block shown in FIG. 20 may be used without the casing.

The light emitting element and the light detecting element may be embedded into the fiber supports 50e/50o.

The shutter plate may have a window so as to intersect the light beam more than once. Even though the window is a simple rectangular opening, the shutter plate firstly interrupts the light beam at the bottom edge, thereafter, the light beam passes through the window, and, finally, the boss portion intersects the light beam again. In this instance, the key velocity is calculated on the basis of the time interval between the first intersection and the second intersection.

Each of the keys may be associated with a plurality of non-contact type position transducers. The non-contact type position transducers may be arranged in two rows the light beams intersect a shutter plate with a window.

The oblique surfaces of the prisms may be coated with reflecting films.

Even though one of the light emitting element and the light detecting element according to the present invention may be replaced with the prior art light emitting element or the prior art light detecting element, the number of component parts is still decreased.

The non-contact type position transducers are arranged in 12×8 matrix in the above described embodiments. However, the matrix size is changeable.

The non-contact type position transducers are available for monitoring the motions of hammers of an acoustic piano. In this instance, the shutter plate may be attached to hammer shanks or catcher shanks.

The light emitting block is similar in structure to the light detecting block so as to be interchangeable with each other.

Finally, the positional information processing system may be used for any system except for the musical instrument.

What is claimed is:

1. A non-contact type position transducer for detecting a current position of a moving body, comprising:

a first light emitting block optically coupled to a light source, for radiating a first light beam along a first optical path extending in a first direction and a second light beam along a second optical path extending in a second direction different from said first direction, a trajectory of said moving body intersecting one of said first optical path and said second optical path; and a light detecting block optically coupled to a light detecting element, for receiving a third light beam radiated from a second light emitting block and one of said first and second light beams at different timings so as to guide said third light beam and said one of said first and second light beams to said light detecting element.

2. The non-contact type position transducer as set forth in claim 1, in which said light source and said light detecting element are connected through a first optical fiber and a second optical fiber to said light emitting block and said light detecting block, and in which said light emitting block includes
a first photo-propagating block having a first boss portion for retaining an outlet end of said first optical fiber and a plurality of first prisms integral with said first boss portion for splitting a fourth light beam radiated from said outlet end into said first light beam and said second light beam, and said light detecting block includes
a second photo-propagating block having a second boss portion for retaining an inlet end of said second optical fiber and a plurality of second prisms integral with said second boss portion for guiding said one of said first light beam and said second light beam and said third light beam to said inlet end.

3. The non-contact type position transducer as set forth in claim 2, in which one of said light emitting block and said light detecting block further includes a plurality of lenses respectively attached to said plurality of first prisms or said plurality of second prisms, said plurality of lenses attached to said plurality of first prisms forming said first light beam and said second light beam into parallel rays, said plurality of lenses attached to said plurality of second prisms causing said one of said first light beam and said second light beam and said third light beam to converge.

4. The non-contact type position transducer as set forth in claim 2, in which said plurality of first prisms are jointed to each other at one edges thereof, and said first optical fiber radiates said fourth light beam toward said one edges so as to equally split said fourth light beam into said first light beam and said second light beam.

5. The non-contact type position transducer as set forth in claim 4, said fourth light beam is split into said first light beam and said second light beam through an internal reflection on oblique surfaces of said plurality of first prisms.

6. The non-contact type position transducer as set forth in claim 2, further comprising a photo-shield casing having a first projecting portion for accommodating said light emitting block and a second projecting portion spaced from said first projecting portion for accommodating said light detecting block, said first projecting portion and said second projecting portion having respective windows so as to allow said first light beam, said second light beam and said third light beam to pass therethrough.

7. The non-contact type position transducer as set forth in claim 1, in which said light source and said light detecting element are connected through a first optical fiber and a second optical fiber to said light emitting block and said light detecting block, and in which said light emitting block includes
a radiating sub-block having a first retainer for directing an outlet end of said first optical fiber in a first direction and a first lens attached to said first retainer for restricting a divergence of a fourth light beam radiated from said outlet end, and
a splitting sub-block spaced from said radiating sub-block and having a first convex portion opposed to said first lens so as to receive said fourth light beam and first prisms jointed to each other at one ends thereof for splitting said fourth light beam into said first light beam and said second light beam, and said light detecting block includes
a reflecting sub-block having second prisms for reflecting said one of said first light beam and said second light beam and said third light beam and a second convex portion for converging said one of said first light beam and said second light beam and said third light beam,
an intake sub-block having a second retainer for supporting an input let of said second optical fiber and a second lens attached to said second retainer for covering said one of said first light beam and said second light beam and said third light beam toward said inlet end.

8. The non-contact type position transducer as set forth in claim 7, further comprising a photo-shield casing having a first projecting portion for accommodating said light emitting block and a second projecting portion spaced from said first projecting portion for accommodating said light detecting block, said first projecting portion and said second projecting portion having respective windows so as to allow said first light beam, said second light beam and said third light beam to pass therethrough.

9. The non-contact type position transducer as set forth in claim 1, in which said light source and said light detecting element are implemented by a semiconductor light emitting element and a semiconductor light detecting element, said light emitting block includes a
first photo-propagating block having a first boss portion for retaining said semiconductor light emitting element and a plurality of first prisms integral with said first boss portion for splitting a fourth light beam radiated from said semiconductor light emitting element into said first light beam and said second light beam, and said light detecting block includes
a second photo-propagating block having a second boss portion for retaining said semiconductor light detecting element and a plurality of second prisms integral with said second boss portion for converging said one of said first light beam and said second light beam and said third light beam toward said semiconductor light detecting element.

10. The non-contact type position transducer as set forth in claim 9, in which one of said light emitting block and said light detecting block further includes a plurality of lenses respectively attached to said plurality of first prisms or said plurality of second prisms, said plurality of lenses attached to said plurality of first prisms forming said first light beam and said second light beam into parallel rays, said plurality of lenses attached to said plurality of second prisms causing said one of said first light beam and said second light beam and said third light beam to converge.

11. The non-contact type position transducer as set forth in claim 9, in which said light emitting block further includes a first retainer embedded into said first boss portion and having a first reflecting surface defining a concave, said semiconductor light emitting element is placed at a center of said first reflecting surface so as to direct said fourth light beam toward said plurality of first prisms, said light detecting block further includes a second retainer embedded into said second boss portion and having a second reflecting surface defining a concave, and said semiconductor light detecting element is placed at a center of said second reflecting surface so that said second reflecting surface directs said one of said first light beam and said second light beam and said third light beam to said semiconductor light detecting element.

12. The non-contact type position transducer as set forth in claim 9, further comprising a photo-shield casing having a first projecting portion for accommodating said light emitting block and a second projecting portion spaced from said first projecting portion for accommodating said light detecting block, said first projecting portion and said second projecting portion having respective windows so as to allow said first light beam, said second light beam and said third light beam to pass therethrough.

13. The non-contact type position transducer as set forth in claim 1, in which said light source and said light detecting element are implemented by a pair of semiconductor light emitting elements and a pair of semiconductor light detecting elements, said light emitting block includes
a first board member having a first major surface and a second major surface to which the semiconductor light emitting elements of said pair are respectively attached, and
first convex lenses covering said semiconductor light emitting elements for forming said first light beam and said second light beam into parallel rays, and said light detecting block includes
a second board member having a third major surface and a fourth major surface to which the semiconductor light detecting elements of said pair are respectively attached, and
second convex lenses covering said semiconductor light detecting elements so as to converge said one of said first light beam and said second light beam and said third light beam toward said semiconductor light detecting elements.

14. The non-contact type position transducer as set forth in claim 13, further comprising a photo-shield casing having a first projecting portion for accommodating said light emitting block and a second projecting portion spaced from said first projecting portion for accommodating said light detecting block, said first projecting portion and said second projecting portion having respective windows so as to allow said first light beam, said second light beam and said third light beam to pass therethrough.

15. The non-contact type position transducer as set forth in claim 1, in which one of said light emitting block and said light detecting block is replaced with two light emitting means respectively radiating said first light beam and said second light beam or two light detecting means respectively receiving said one of said first light beam and said second light beam and said third light beam.

16. A positional information processing system for detecting a variation of each of a plurality of moving bodies respectively movable along trajectories, comprising:

a plurality of light emitting blocks and a plurality of light detecting blocks alternately arranged between said trajectories, each of said plurality of light emitting blocks respectively radiating a first light beam along a first optical path across one of said trajectories and a second light beam along a second optical path across another of said trajectories, each of said plurality of light detecting blocks receiving said first light beam radiated from one of said plurality of light emitting blocks and said second light beam radiated from another of said plurality of light emitting blocks;

a light generating means optically connected to said plurality of light emitting blocks for selectively supplying a photo-pulse to said plurality of light emitting blocks at different timings;

a light detecting means optically connected to said plurality of light detecting blocks for converting said first light beam and said second light beam to electric detecting signals at said different timings; and a data processing means supplying an electric driving signal to light generating means so as to cause said light generating means to repeatedly generate said photo-pulse at said different timings, and deciding at least one of said plurality of moving bodies intersecting one of said first light beam and said second light beam on the basis of one of said plurality of light emitting blocks radiating said one of said first light beam and said second light beam and one of said plurality of light detecting blocks receiving said one of said first light beam and said second light beam.

* * * * *